US012776919B2

(12) United States Patent
Gan et al.

(10) Patent No.: US 12,776,919 B2
(45) **Date of Patent: *Oct. 27, 2026**

(54) METHOD FOR IMPLEMENTING SECURITY, DEVICE, NETWORK ELEMENT, AND CHIP

(71) Applicant: GUANGDONG OPPO MOBILE TELECOMMUNICATIONS CORP., LTD., Dongguan (CN)

(72) Inventors: Lu Gan, Dongguan (CN); Xuefeng Liu, Dongguan (CN); Jipeng Zou, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 1 day.

This patent is subject to a terminal disclaimer.

(21) Appl. No.: 18/895,027

(22) Filed: Sep. 24, 2024

(65) Prior Publication Data

US 2025/0016005 A1 Jan. 9, 2025

Related U.S. Application Data

(63) Continuation of application No. PCT/CN2022/083173, filed on Mar. 25, 2022.

(51) Int. Cl.
*H04L 9/40* (2022.01)
*H04L 9/32* (2006.01)

(52) U.S. Cl.
CPC ........ *H04L 9/3247* (2013.01); *H04L 63/0823* (2013.01)

(58) Field of Classification Search
CPC .......................... H04L 9/3247; H04L 63/0823
USPC .......................................................... 713/176
See application file for complete search history.

(56) References Cited

U.S. PATENT DOCUMENTS

| | | | |
|---|---|---|---|
| 9,445,270 B1 | 9/2016 | Bicket et al. | |
| 11,223,951 B1 | 1/2022 | Farmer et al. | |
| 2013/0117558 A1 | 5/2013 | Metke et al. | |
| 2020/0366667 A1* | 11/2020 | Cebe | H04L 9/302 |

(Continued)

FOREIGN PATENT DOCUMENTS

| | | |
|---|---|---|
| CN | 106507350 | 3/2017 |
| CN | 107924437 | 4/2018 |

(Continued)

OTHER PUBLICATIONS

WIPO, International Search Report and Written Opinion for PCT/CN2022/083173, issued on Sep. 21, 2022.

(Continued)

*Primary Examiner* — Michael S McNally
(74) *Attorney, Agent, or Firm* — Hodgson Russ LLP

(57) ABSTRACT

The method for implementing security, applicable to a first device, includes: acquiring an authorization certification of a first network element, wherein the authorization certification is used to verify whether the first network element is authorized to receive data, the data being originated from at least one second device associated with the first device; and the authorization certification comprises a first digital signature; and determining that the first network element is authorized to receive the data from the at least one second device based on a successful verification on the authorization certification based on the first digital signature.

19 Claims, 14 Drawing Sheets

(56) References Cited

U.S. PATENT DOCUMENTS

| | | | | |
|---|---|---|---|---|
| 2021/0058396 | A1 | 2/2021 | Nathanson | |
| 2021/0176039 | A1* | 6/2021 | Fang | H04L 9/3073 |
| 2024/0364540 | A1 | 10/2024 | Sai et al. | |

FOREIGN PATENT DOCUMENTS

| | | |
|---|---|---|
| CN | 108282453 | 7/2018 |
| CN | 109104396 | 12/2018 |
| CN | 109756450 | 5/2019 |
| CN | 111245830 | 12/2021 |
| CN | 113965370 | 1/2022 |
| CN | 114124375 | 3/2022 |
| EP | 3618398 | 3/2020 |
| EP | 3806385 | 4/2021 |
| WO | 2014175721 | 10/2014 |

OTHER PUBLICATIONS

"3rd Generation Partnership Project; Technical Specification Group Services and System Aspects; System architecture for the 5G System (5GS); Stage 2 (Release 17)," 3GPP TS 23.501, Dec. 2022, v17.7.0.

"3rd Generation Partnership Project; Technical Specification Group Services and System Aspects; Security architecture and procedures for 5G system (Release 17)," 3GPP TS 33.501, Mar. 2022, v17.5.0.

"3rd Generation Partnership Project; Technical Specification Group Services and System Aspects; 3G Security; Security architecture (Release 17)," 3GPP TS 33.102, Mar. 2022, v17.0.0.

"3rd Generation Partnership Project; Technical Specification Group Services and System Aspects; 3G Security; Specification of the Milenage Algorithm Set: An example algorithm set for the 3GPP authentication and key generation functions f1, f1*, f2, f3, f4, f5 and f5 *; Document 5: Summary and results of design and evaluation (Release 16)," 3GPP TR 35.909, Jul. 2020, v16.0.0.

"3rd Generation Partnership Project: Technical Specification Group Services and System Aspects; Generic Authentication Architecture (GAA); Generic Bootstrapping Architecture (GBA) (Release 17)," 3GPP TS 33.220, Dec. 2021, v17.2.0.

IMT-2030(6G)Promotion Group, "6G Research report on communication perception integration technology," Sep. 2021.

IMT-2030(6G)Promotion Group, "6G Network Security vision technology research report," Sep. 2021.

EPO, Extended European Search Report for EP Application No. 22932752.3, Oct. 20, 2025.

WIPO, International Search Report and Written Opinion for PCT/CN2022/083164, Dec. 15, 2022.

EPO, Extended European Search Report for EP Application No. 22932747.3, Oct. 27, 2025.

USPTO, Non-Final Office Action for U.S. Appl. No. 18/891,734, filed Dec. 16, 2025.

Shafagh et al., "Droplet: Decentralized Authorization for IoT Data Streams," arXiv: 1806.02057v2, Nov. 14, 2018.

USPTO, Final Office Action for U.S. Appl. No. 18/891,734, filed Jun. 25, 2026.

* cited by examiner

METHOD FOR IMPLEMENTING SECURITY, DEVICE, NETWORK ELEMENT, AND CHIP

CROSS-REFERENCE TO RELATED APPLICATION

This application is a continuation application of International Application No. PCT/CN2022/083173, filed on Mar. 25, 2022, the entire disclosure of which is hereby incorporated herein by reference.

TECHNICAL FIELD

Embodiments of present disclosure relate to the technical field of communications, and in particular, relate to a method for implementing security, a device, a network element, and a chip.

BACKGROUND

The $5^{th}$ generation (5G) mobile communication technology is applied to three major application scenarios, including enhanced mobile broadband (eMBB), massive machine-type communication (mMTC), and ultra-high reliable low latency communication (uRLLC). With the evolution of communication technologies, the Internet of things (IoT) application of terminals such as an industrial wireless sensor, a video monitor, and a wearable device put forward new requirements such as reduced complexity and cost, reduced size, and lower energy consumption on 5G devices. The zero-power communication technology has significant advantages in power consumption, size, and cost of the devices, and becomes a research hotspot.

SUMMARY

The embodiments of present disclosure provide a method for implementing security, a device, a network element, and a chip.

Some embodiments of present disclosure provide a method for implementing security, applicable to a first device. The method includes:

- acquiring an authorization certification of a first network element, wherein the authorization certification is used to verify whether the first network element is authorized to receive data, the data being originated from at least one second device associated with the first device; and the authorization certification includes a first digital signature; and
- determining that the first network element is authorized to receive the data from the at least one second device based on a successful verification on the authorization certification based on the first digital signature.

Some embodiments of present disclosure provide a method for implementing security, applicable to a first network device. The method includes:

- transmitting second request information to a first device, wherein the second request information requests the first device to authorize the first network element to acquire data of at least one second device, the at least one second device being associated with the first device;
- wherein the second request information includes an authorization certification, the authorization certification being used for the first device to verify whether the first network element is authorized to receive the data of the at least one second device, and the authorization certification being verified based on a first digital signature included in the authorization certification.

Some embodiments of present disclosure provide a first device. The first device includes: a processor and a memory storing one or more computer programs, wherein the processor, when loading and running the one or more computer programs stored in the memory, is caused to perform the above method for implementing security.

Some embodiments of present disclosure provide a first network element. The first network element includes: a processor and a memory storing one or more computer programs, wherein the processor, when loading and running the one or more computer programs stored in the memory, is caused to perform the above method for implementing security.

Some embodiments of present disclosure provide a chip. The chip is used to perform the above method for implementing security. For example, the chip includes a processor, wherein the processor, when loading and running one or more computer programs from a memory, cause a device equipped with the chip to perform the above methods for implementing security.

DETAILED DESCRIPTION

The technical solutions according to the embodiments of the present disclosure are described in detail in combination with the accompanying drawings. Apparently, the described embodiments are merely some embodiments rather than all embodiments of the present disclosure. Based on the embodiments of the present disclosure, all other embodiments derived by those of ordinary skill in the art without creative efforts shall fall within protection scope of the present disclosure.

Figure 1:
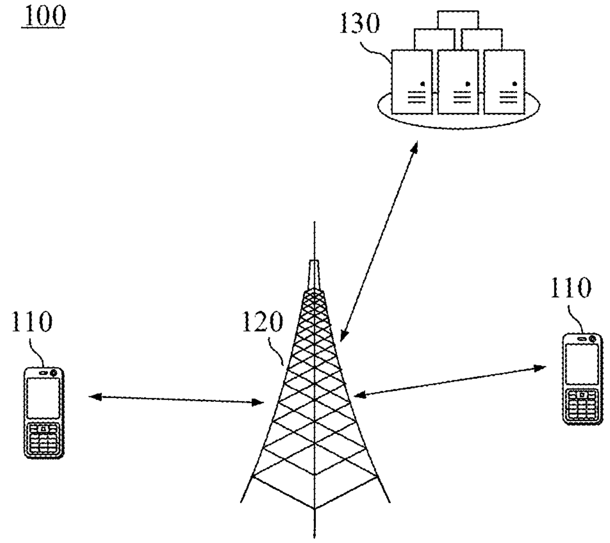
FIG. 1 is a schematic diagram of a network architecture of a communication system according to some embodiments of the present disclosure.

FIG. 1 is a schematic diagram of a network architecture of a communication system according to some embodiments of the present disclosure. As shown in FIG. 1, the communication system 100 includes a terminal device 110 and a network device 120. The network device 120 communicates with the terminal device 110 over a radio air interface, and multi-service transmission is supported between the terminal device 110 and the network device 120.

It is understandable that the embodiments of the present disclosure are illustrated by taking the communication system 100 as an example, but are not limited thereto. That is, the technical solutions according to the embodiments of the present disclosure are applicable to various communication systems, for example, a long-term evolution (LTE) system, an LTE time division duplex (TDD) system, a universal mobile telecommunication system (UMTS), an Internet of things (IoT) system, a narrow band IoT (NB-IoT) system, an enhanced machine-type communications (eMTC) system, a 5G communication system (also referred to as a new radio (NR) communication system), or other future evolved communication systems.

In the communication system 100 shown in FIG. 1, the network device 120 is an access network device in communication with the terminal device 110. The access network device provides communication coverage for a specific geographic region, and communicates with the terminal device 110 (for example, UE) in the geographic region.

The network device 120 is an evolved Node B (eNB or eNodeB) in the LTE system, a next generation radio access network (NG RAN) device, a gNB in the NR system, or a wireless controller in a cloud radio access network (CRAN). Alternatively, the network device 120 is a relay station, an access point, an in-vehicle device, a wearable device, a concentrator, a switch, a bridge, a router, a network device in a future evolved public land mobile network (PLMN), or the like.

The terminal device 110 is any terminal device, and the terminal device 110 includes, but is not limited to, a terminal device connected to the network device 120 or other terminal devices in a wired or wireless mode.

For example, the terminal device 110 is an access device, a user equipment (UE), a subscriber unit, a subscriber station, a mobile station, a mobile station, a remote station, a remote console, a mobile device, a user terminal, a terminal, a wireless communication device, a user agent, a user device, or the like. The access device is a cellular phone, a cordless phone, a Session Initiation Protocol (SIP) phone, an IoT device, a satellite handheld terminal, a wireless local loop (WLL) station, a personal digital assistant (PDA), a handheld device with the wireless communication function, a computing device or other processing devices connected to a wireless modem, an in-vehicle device, a wearable device, a terminal device in the 5G network, a terminal device a future evolved network, or the like.

In some embodiments, the wireless communication system 100 further includes a core network device 130 in communication with a base station, wherein the core network device 130 may be a 5G core (5GC) device, e.g., an access and mobility management function (AMF), an authentication server function (AUSF), a user plane function (UPF), or a session management function (SMF). In some embodiments, the core network device 130 is an evolved packet core (EPC) device in the LTE network, e.g., an SMF+core packet gateway (SMF+PGW-C) device. It is understandable that the SMF+PGW-C can achieve the functions that SMF and PGW-C can achieve simultaneously. During the evolution of network, the above core network devices may also have other names, or may form new network entities by dividing the functions of the core network, which are not limited in the embodiments of the present disclosure. Communication may be achieved between various functional units in the communication system 100 by establishing a connection over a next generation (NG) interface.

For example, the terminal device establishes an air interface connection with the access network device over the NR interface for transmitting user plane data and control plane signaling. The terminal device establishes a control plane signaling connection with the AMF over an NG interface 1 (N1 for short); the access network device, such as the next generation radio access base station (gNB), establishes a user plane data connection with the UPF over an NG interface 3 (N3 for short); the access network device establishes a control plane signaling connection with the AMF over an NG interface 2 (N2 for short); the UPF establishes a control plane signaling connection with the SMF over an NG interface 4 (N4 for short); the UPF exchanges user plane data with a data network over an NG interface 6 (N6 for short); the AMF establishes a control plane signaling connection with the SMF over an NG interface 11 (N11 for short); and the SMF establishes a control plane signaling connection with the PCF over an NG interface 7 (N7 for short).

FIG. 1 schematically shows a base station, a core network device, and two terminal devices. In some embodiments, the wireless communication system 100 includes a plurality of base stations and the coverage area of each of the plurality of base stations may include other numbers of terminal devices, which are not limited in the embodiments of the present disclosure.

It should be noted that FIG. 1 only illustrates the system applied by the present disclosure, and the methods according to the embodiments of the present disclosure are also applicable to other systems. In addition, the terms "system" and "network" herein are interchangeably used in the present disclosure. The term "and/or" herein merely indicates an association relationship describing associated objects, that is, three types of relationships. For example, the phrase "A and/or B" indicates (A), (B), or (A and B). In addition, the character "/" generally indicates an "or" relationship between the associated objects. It is understandable that the term "indicate" in the embodiments of the present disclosure means a direct indication, an indirect indication, or an associated relationship. For example, A indicating B, which mean that A indicates B directly, e.g., B is acquired by A; or that A indicates B indirectly, e.g., A indicates C, wherein B is acquired by C; or that an association relationship is present between A and B. It is understandable that the term "corresponding" may indicate a direct corresponding relationship or indirect corresponding relationship between two objects, or indicate an association relationship between two objects, or indicate relationships such as indicating and being indicated, configuring and being configured, or the like. It is understandable that the "predefined" or "a predefined rule" is implemented by pre-storing a corresponding code, a table, or another manner that may indicate related information in the device (for example, the terminal device or the network device), and the specific implementations are not limited in the present disclosure. For example, the term "predefined" refers to defined in a protocol. It is understandable that the term "protocol" indicates a standard protocol in the field of communications. For example, the protocols include the LTE protocol, the NR protocol, and related protocols applied to the future communication system, which are not limited in the present disclosure.

For ease of understanding of the technical solutions according to the embodiments of the present disclosure, the technical solutions are described in detail hereinafter by ways of specific embodiments. A related technology as an optional solution may be arbitrarily combined with the technical solutions according to the embodiments of the present disclosure, and the combined technical solutions fall within the protection scope of the embodiments of the present disclosure. The embodiments of the present disclosure include at least some of the following contents.

The zero-power communication technology has significant advantages in terms of power consumption, size, cost, and the like of devices. For example, with respect to the power consumption, the zero-power communication technology is expected to reduce the power consumption of a device from tens of milliwatts of a narrow band Internet of things (NB-IoT) device to tens of microwatts or even several microwatts; and with respect to the cost, the zero-power communication technology is expected to reduce the cost of a device from more than ten yuan of a cheapest NB-IoT device to one yuan or even less. The main characteristic of the zero-power communication technology is to achieve backscatter communication by modulating an incoming wave signal, and further acquire energy through energy harvesting to drive a digital logic circuit or a chip (such as a micro control unit or a sensor chip), thereby implementing functions such as encoding, encrypting, and simple computation of signals.

However, a conversion efficiency of radio frequency (RF) energy in the zero-power communication technology is often less than 10%, which means that the power required to drive the digital logic circuit or the chip for computing cannot be too high. Although the number of times that per microjoule of energy can be used for computation has increased with the improvement in process and optimization in design, complex computing still fails to be satisfied. A computing capability of a zero-power device is very limited, such that the zero-power device cannot support the security functions defined in SHA-256 or the 3GPP authentication mechanism. Therefore, it is an urgent technical problem to be solved as to how zero-power devices or other low-capability devices authorize a transmission of uplink data to prevent transmission of uplink data of the devices being maliciously triggered by attackers or pseudo base stations and ensure the security of the uplink data transmission.

Figure 2:
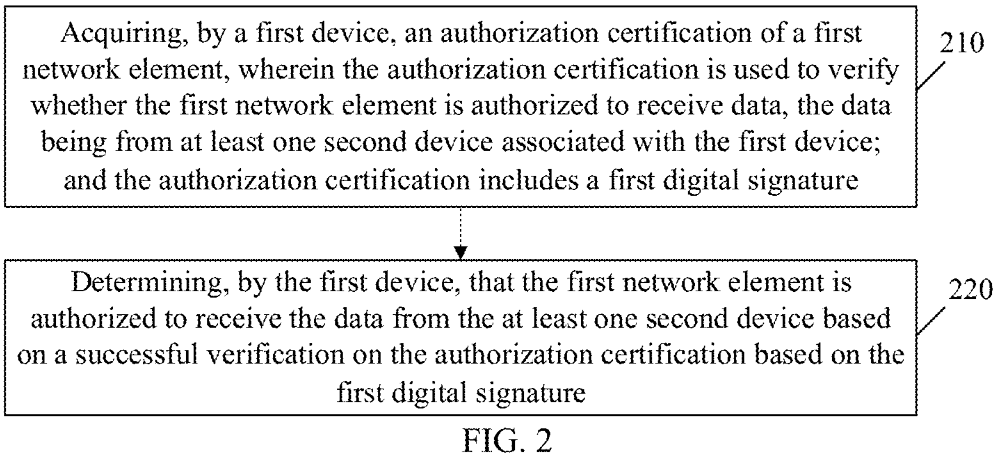
FIG. 2 is a first schematic flowchart of a method for implementing security according to some embodiments of the present disclosure.

Accordingly, the embodiments of the present disclosure provide a method for implementing security. As shown in FIG. 2, the method includes, but is not limited to, the following processes.

In S210, a first device acquires an authorization certification of a first network element, wherein the authorization certification is used to verify whether the first network element is authorized to receive data, the data being originated from at least one second device associated with the first device; and the authorization certification includes a first digital signature.

In S220, the first device determines that the first network element is authorized to receive the data from the at least one second device based on a successful verification on the authorization certification based on the first digital signature.

In some embodiments of the present disclosure, the first device is a device supporting a device authentication mechanism algorithm. For example, the first device is a user equipment (UE), a base station, or another device that supports a complex operation, which is not limited in the embodiments of the present disclosure.

In some embodiments, the second device is a low computing capability device that does not support the device authentication mechanism algorithm, that is, the second device is unable to perform security computing alone. For example, the second device is a zero-power device (ZPD), or a low-capability device with a low computing capability, or a device with a low battery balance, which is not limited in the embodiments of the present disclosure.

In the embodiments of the present disclosure, because the second device has a low computing capability, the second device is bound to the first device to form an association relationship, such that the second device can take advantage of the complete computing capability and/or the communication mechanism of the first device with which it is associated to achieve authorization for a network element on the network side. The first device is bound to one or more second devices.

In some embodiments, the second device communications with the first device by modulating an incoming wave signal using a backscatter technology.

Additionally, the first network element mentioned in the embodiments of the present disclosure may be a network element on the network side, e.g., the first network element is a core network element, an access network element, a network element in a third-party application network, or the like, which is not limited in the embodiments of the present disclosure. For example, the first network element is a sensing server, wherein the sensing server is an application server that provides sensing services (e.g., positioning, speed measurement, and health call services).

In some embodiments, in the case that the first device is a UE, the first network element is a base station or an application server; and in the case that the first device is a base station, the first network element is an application server.

In the embodiments of the present disclosure, the first device may acquire the authorization certification of the first network element, and verify whether the first network element is authorized to acquire data of the at least one second device associated with the first device based on the authorization certification. The authorization certification of the first network element includes the first digital signature. The first device may determine whether the first network element is authorized to access the data from the at least one second device by verifying the authorization certification based on the first digital signature.

In some embodiments, the data mentioned in the embodiments of the present disclosure is uplink data of the second device, and the data may include a wireless signal, a reflected signal, control plane data, user plane data, or the like. The data transmitted from the second device is not limited in the embodiments of the present disclosure. For example, in the case that the second device is a sensing device, the data is sensing data.

In some embodiments, in the case that the first device determines that the first network element is authorized to acquire the data of the at least one second device associated with the first device, the second device transmits the generated data to the first network element directly, or the second device forwards the generated data to the first network element over the first device, which are not limited in the embodiments of the present disclosure.

That is, the first network element may receive the data from the first device, wherein the data is transmitted from the at least one second device to the first device. Alternatively, the first network element may receive the data from the at least one second device.

In summary, in the method for implementing security according to the embodiments of the present disclosure, the first device may verify the authorization certification of the first network element on behalf of the at least one second device associated with the first device. The first device may determine that the first network element is authorized to receive data of the at least one second device based on a successful verification on the authorization certification. In this way, the second device with the low computing capability may achieve the verification of the network element on the network side, thereby avoiding the problem of data theft and leakage during data transmission of the second device, and ensuring the security of the data transmission of the second device.

In some embodiments, the first digital signature is a signature of a certification issuing device, that is, the first digital signature is acquired by signing information other than the first digital signature in the authorization certification with a private key of the certification issuing device. It is understandable that the certification issuing device is a device that generates the authorization certification of the first network element.

In some embodiments, the authorization certification includes at least one of: service identification information, a public key of the certification issuing device, identification information of the first network element, a public key of the first network element, an RSA accumulator parameter corresponding to the first network element, or data identification information.

In the case that the first network element acquires data based on service needs, the authorization certification of the first network element includes the service identification information. The service identification information indicates a service type of the data required by the first network element. The service type may include a positioning service, a speed measurement service, a health call service, an environment monitoring service, or the like, which is not limited in the embodiments of the present disclosure.

In some embodiments, the service identification information is a fixed-length bit of data. Different bits of data correspond to different service types. The first device determines the service type of the bit of data by looking up a table.

In some embodiments, the service identification information is the identification information of the first network element. Generally, the first network element provides one or more services, and thus the required service types are different. On this basis, the service type of data may be characterized by the identification information of the first network element in the embodiments of the present disclosure.

The RSA accumulator parameter corresponding to the first network element is used to verify whether the authorization certification of the first network element is revoked. It is understandable that there are scenarios where the authorization certification is revoked in actual application. Therefore, the RSA parameter of the authorization certification needs to be carried in the authorization certification, such that the first device can verify whether the acquired authorization certification of the first network element is revoked.

Additionally, the data identification information indicates the data type of the data, wherein the number of data types is one or more. For example, in the case that the service is the health call service, the data type includes heart rate data, body temperature data, exercise data, blood pressure data, respiratory frequency data, and the like; and in the case that the service is the environment monitoring service, the data type includes location data, wind speed data, temperature data, sunlight data, altitude data, and the like. The data type is not limited in the embodiments of the present disclosure.

It should be noted that the certification issuing device generates the authorization certification of the first network element based on a request from the first network element. The certification issuing device is an application provider certificate authority (CA), a service server, or an operator CA, which is not limited in the embodiments of the present disclosure. In addition, relevant contents of requesting the certification issuing device by the first network element to generate the authorization certification are described in detail hereinafter and not repeated herein for brevity.

Figure 3:
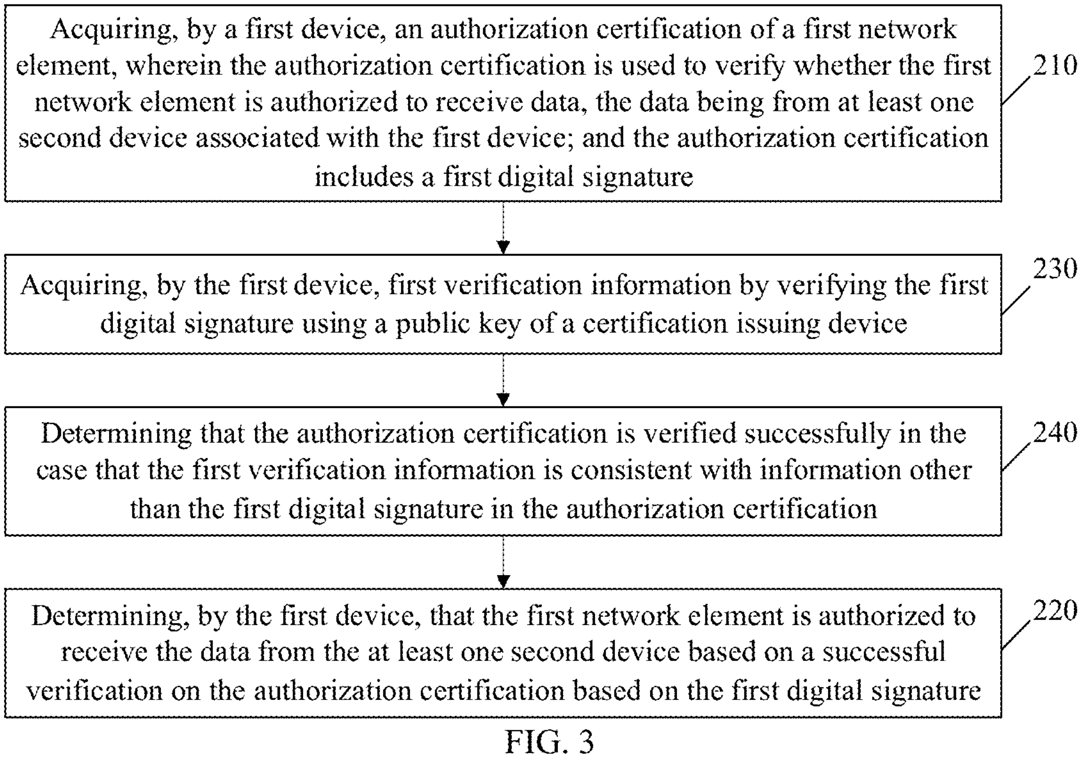
FIG. 3 is a second schematic flowchart of a method for implementing security according to some embodiments of the present disclosure.

In some embodiments, the first digital signature is acquired by signing all or some of the above information with the private key of the certification issuing device. Correspondingly, as shown in FIG. 3, prior to S220, the verification of the authorization certification is performed by the following processes.

In S230, the first device acquires first verification information by verifying the first digital signature using a public key of the certification issuing device.

In S240, the first device determines that the authorization certification is verified successfully in the case that the first verification information is consistent with information other than the first digital signature in the authorization certification.

It is understandable that because the first digital signature is acquired by signing with the private key of the certification issuing device, the first device may acquire the first verification information by verifying the first digital signature using the public key of the certification issuing device. The first device determines that the first network element is authorized to acquire the data of the at least one second device only in the case that the first verification information is consistent with the information other than the first digital signature in the authorization certification. In the case that the first verification information is not consistent with the information other than the first digital signature in the authorization certification, the first device does not perform further processing.

It should be noted that the first device may acquire the public key of the certification issuing device from the authorization certification to verify the first digital signature. Alternatively, the first device may store the public key of the certification issuing device in advance, and verify the first digital signature using the pre-stored public key. The source of the public key of the certification issuing device is not limited in the embodiments of the present disclosure.

In some embodiments, in the case that the authorization certification includes the RSA accumulator parameter corresponding to the first network element, S220 in which the first device determines that the first network element is authorized to receive the data from the at least one second device based on the successful verification on the authorization certification based on the first digital signature is implemented by the following processes.

Based on the RSA accumulator parameter, the first device verifies, based on the successful verification on the authorization certification based on the first digital signature, whether the authorization certification of the first network element is revoked.

The first device determines that the first network element is authorized to receive the data of the at least one second device in the case that the authorization certification is not revoked.

It is understandable that after the authorization certification of the first network element is verified successfully, the first device may further verify, based on the RSA accumulator parameter, whether the authorization certification is revoked. In the case that the authorization certification of the first network element is not revoked, the first device determines that the first network element is authorized to receive the data of the at least one second device associated with the first device. In the case that the authorization certification of the first network element is revoked, the first device determines that the first network element is not authorized to acquire the data of the second device. In this way, the authorization efficiency of first device for the uplink data of the second device is improved.

In some embodiments, in the case that the authorization certification of the first network element includes the service identification information and/or data identification information, prior to verifying the authorization certification, the first device further needs to determine whether the second device associated with the first device supports the service type indicated by the service identification information and/or the data type indicated by the data identification information.

The service identification information carried in the authorization certification characterizes the service type of the data that the first network element needs to acquire. The data identification information carried in the authorization certification characterizes the data type of the data that the first network element needs to acquire. Therefore, upon acquiring the authorization certification of the first network element, the first device needs to first determine whether the at least one second device associated with the first device supports the service type and/or data type required by the first network element.

In some embodiments, the first device maintains a service type list, wherein the service type list stores the identification information of each of the at least one second device associated with the first device and the service type supported by each of the at least one second device. In this way, upon acquiring the authorization certification of the first network element, the first device compares the service type of the service identification information in the authorization certification with the service type supported by each of the at least one second device in the list, and determines the second device that supports the service type.

In some embodiments, the first device further maintains a data type list, wherein the data type list stores the identification information of each of the at least one second device associated with the first device and the data type supported by each of the at least one second device. In this way, upon acquiring the authorization certification of the first network element, the first device compares the data type of the data identification information in the authorization certification with the data type supported by each of the at least one second device in the list, and determines the second device that supports the data type.

The first device initiates the process of verifying the authorization certification of the first network element only in the case that any one of the at least one second device associated with the first device supports the service type and/or the data type, and verifies the authorization certification of the first network element based on the first digital signature. In the case that none of the at least one second device associated with the first device supports the service type and/or the data type, the first device ignores the authorization certification and does not verify the authorization certification. In this way, it is ensured that the service type of the data received by the first network element is a service type meeting the needs of the first network element, and/or the data type of the data received by the first network element is a data type meeting the needs of the first network element, thereby improving the efficiency of data authorization.

Figure 4:
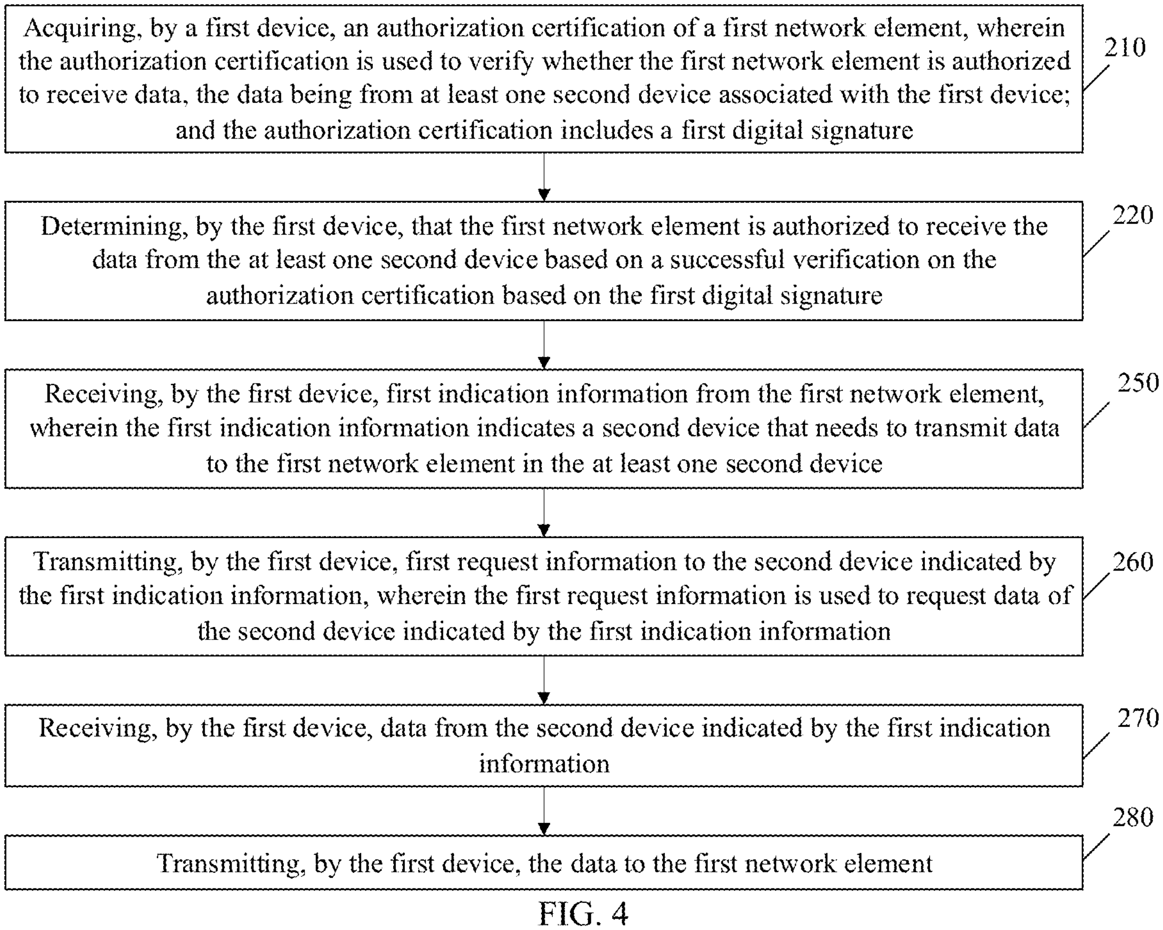
FIG. 4 is a third schematic flowchart of a method for implementing security according to some embodiments of the present disclosure.

In some embodiments, with reference to the flowchart shown in FIG. 4, upon S220 in which the first device determines that the first network element is authorized to receive the data from the at least one second device, the method for implementing security according to the embodiments of the present disclosure further includes the following processes.

In S250, the first device receives first indication information from the first network element, wherein the first indication information indicates a second device that needs to transmit data to the first network element in the at least one second device.

In S260, the first device transmits first request information to the second device indicated by the first indication information, wherein the first request information is used to request data of the second device indicated by the first indication information.

In the embodiments of the present disclosure, upon determining that the first network element is authorized to acquire the data, the first network element informs the first device which second devices are required to transmit data to the first network element over the first indication information, and then the first device requests data of the second devices indicated by the first indication information by transmitting the first request information to the second devices indicated by the first indication information.

It should be noted that the at least one second device associated with the first device includes the second device indicated by the first indication information.

In some embodiments, the first indication information includes the identification information of the second devices that are required to transmit data to the first network element. In this way, the first device transmits the first request information to the second device corresponding to the identification information carried in the first indication information.

In some embodiments, upon receiving the first request information, the second device indicated by the first indication information transmits its data directly to the first network element, or forwards its data to the first network element over the first device, which are not limited in the embodiments of the present disclosure.

In some embodiments, as shown in FIG. 4, upon S260, the method for implementing security according to the embodiments of the present disclosure further includes the following processes.

In S270, the first device receives data from the second device indicated by the first indication information.

In S280, the first device transmits the data to the first network element.

In the embodiments of the present disclosure, upon initiating a data request to the second device indicated by the first indication information, the first device may act as a relay device to forward the data fed back by the second device to the first network element, thereby achieving accurate data transmission and ensuring the data transmission efficiency.

In some embodiments, in the case that the authorization certification includes the service identification information and/or the data identification information, S260 in which the first device transmits the first request information to the second device indicated by the first indication information may be implemented by the following process.

The first device transmits the first request information to the second device supporting the service type indicated by the service identification information and/or the data type indicated by the data identification information in the second device indicated by the first indication information.

That is, upon receiving the first indication information, the first device transmits the first request information only to the second terminal supporting the service type of the service identification information and/or the data type of the data identification information in the second device indicated by the first indication information. In this way, it is ensured that the service type of the data from the second device matches the service type required by the first network element, and the transmission efficiency can be improved.

In some embodiments, before the first device transmits the first request information to the second device indicated by the first indication information in S260, the first device mutually authenticates with each of the second devices to ensure that each other are trusted devices. Only in the case that the first device and the second devices pass the mutual authentication, the first device continues to perform S260 and S270, thereby implementing secure data transmission with the second device on the physical layer. In this way, the data is prevented from being stolen or tampered with by third party attackers.

In the embodiments of the present disclosure, a simple device authentication process is performed between the first device and the second device. For example, the first device and the second device perform the authentication process based on an initial key K of the second device. The initial key K is a symmetric key, and the initial key K of each second device is stored in a local storage space of the second device. Alternatively, the first device and the second device acquire a physical layer security key s by negotiating with each other based on the initial key K, and then the first device and the second device perform the device authentication process based on the key s. The authentication method between the first device and the second device is not limited in the embodiments of the present disclosure.

In the embodiments of the present disclosure, the first device acquires the authorization certification of the first network element in a variety of approaches, two of which are described in detail hereinafter.

Approach 1

Figure 5:
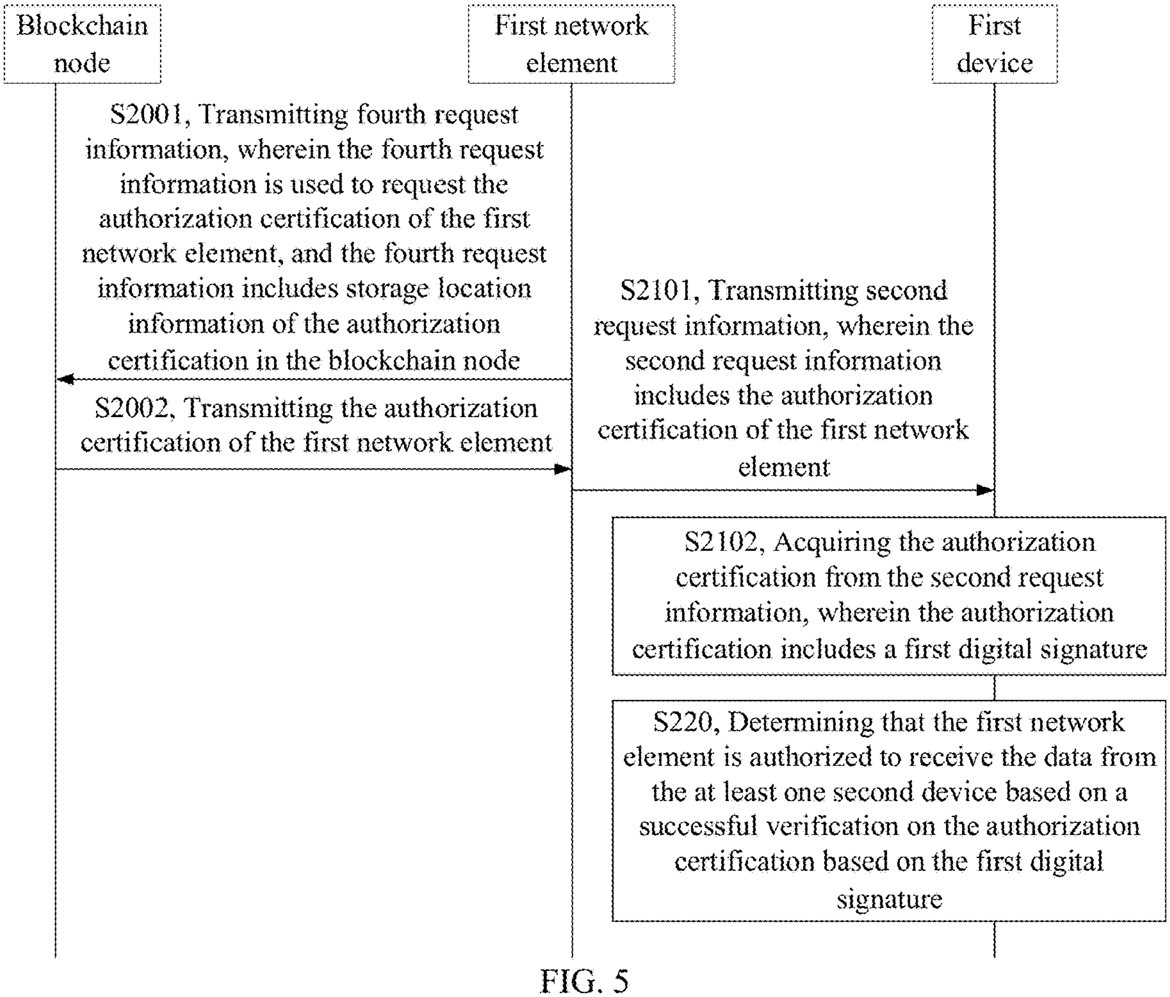
FIG. 5 is a fourth schematic flowchart of a method for implementing security according to some embodiments of the present disclosure.

In some embodiments of the present disclosure, referring to FIG. 5, S210 in which the first device acquires the authorization certification of the first network element is implemented by the following processes.

In S2101, the first device receives second request information from the first network element, wherein the second request information is used to request the first device to authorize the first network element to acquire the data of the at least one second device, and the second request information includes the authorization certification.

In S2102, the first device acquires the authorization certification from the second request information.

It is understandable that the first network element may transmit the second request information to the first device with which the second device is bound/associated in the case that the first network element needs to acquire the data of the second device. The authorization certification of the first network element is carried in the second request information. In this way, upon receiving the second request information, the first device acquires the authorization certification of the first network element from the second request information, and determines whether the first network element is authorized to acquire the data from the second device by verifying the authorization certification based on the first digital signature in the authorization certification.

In some embodiments, upon receiving the second request information, the first device first determines whether the first network element is a trusted network element and whether the second request information is tampered with by verifying an identity of the first network element transmitting the second request information. The first device acquires the authorization certification based on the first request information and verifies the authorization certification only based on a successful verification on the identity of the first network element, thereby ensuring that the data of the second device associated with the first device is not leaked and stolen during the subsequent transmission process.

In some embodiments, the first device verifies the identity of the first network element using a shared key with the first network element, or verifies the identity of the first network element using a public key of the first network element, which is not limited in the embodiments of the present disclosure.

In some embodiments, the second request information includes at least one of: identification information of the first network element, identification information of the first device, identification information of each of the at least one second device, a channel parameter, the channel parameter being used to establish a trusted channel between the first network element and the first device, a public key of the first network element, or a second digital signature. The second digital signature is acquired by signing information other than the second digital signature in the second request information with the private key of the first network element.

It is understandable that in the case that the first request information includes the second digital signature, the first device may verify the identity of the first network element based on the second digital signature. The first device verifies the identity of the first network element as follows.

The first device acquires second verification information by verifying the second digital signature using the public key of the first network element; and the first device determines that the identity of the first network element is verified successfully in the case that the second verification information is consistent with information other than the second digital signature in the second request information.

In some embodiments, the first device maintains a public key list, wherein the public key list stores identification information of a plurality of network elements and a public key corresponding to each of the plurality of network elements. Upon receiving the second request information from the first network element, the first device looks up the public key corresponding to the identification information of the first network element from the public key list, and then acquires the second verification information by verifying the second digital signature based on the public key.

In some embodiments, in the case that the second request information includes the public key of the first network element, the first device acquires the second verification information by verifying the second digital signature based on the public key carried in the second request information. The approach for acquiring the public key of the first network element is not limited in the embodiments of the present disclosure.

It is understandable that in the case that the second verification information is consistent with the information other than the second digital signature in the second request information, the first device may determine that the first network element is a trusted network element and the second request information is not tampered with. The first network element may be verified based on the authorization certification in the second request information to determine whether the first network element is authorized to acquire the data from the second device.

In the case that the second verification information is not consistent with the information other than the second digital signature in the second request information, the first device determines that the first network element is an untrusted network element and/or the second request information is tampered with by a third party. In this case, the first device ignores the second request information and does not perform further processes.

In summary, in the method for implementing security according to the embodiments of the present disclosure, the first network element requests the first device to perform verification and authorize the first network element to acquire the data from the second device by actively transmitting the first request information carrying its authorization certification to the first device. In this way, it is ensured that the uplink data of the second device is not leaked and stolen.

In some embodiments, before the first device receives the second request information from the first network element in S2101, the first network element generates the second request information by acquiring its authorization certification.

In some embodiments, the authorization certification of the first network element is stored in a local storage space of the first network element, and in the case that the first network element needs to acquire the data of the second device, the first network element acquires the authorization certification from the local storage space, and transmits the authorization certification to the first device bound/associated with the second device over the second request information.

In some embodiments, the authorization certification is not stored locally in the first network element but is distributedly stored in a blockchain node in a decentralized identity (DID) manner. In the case that the first network element needs to acquire the data of the second device, the first network element acquires the authorization certification of the first network element from a storage block of the blockchain node. Referring to the flowchart shown in FIG. 5, the first network element may further perform the following processes prior to transmitting the second request information to the first device.

In S2001, the first network element transmits fourth request information to the blockchain node, wherein the fourth request information is used to request the authorization certification of the first network element, and the fourth request information includes storage location information of the authorization certification in the blockchain node.

In S2002, the first network element receives the authorization certification of the first network element from the blockchain node.

That is, prior to transmitting the second request information to the first device, the first network element requests to acquire the authorization certification of the first network element from the blockchain node based on the storage location information of the authorization certification of the first network element. Upon receiving the authorization certification fed back by the blockchain node, the first network element transmits the acquired authorization certification to the first device by carrying the authorization certification in the second request information, such that the first device authorizes the first network element to acquire the data of the second device associated with the first device.

In some embodiments, the authorization certification includes the first digital signature of the certification issuing device. Therefore, upon receiving the authorization certification from the blockchain node, the first network element determines the authenticity of the authorization certification by verifying the first digital signature using the public key of the certification issuing device. In the case that the first digital signature is verified successfully, the first network element transmits the authorization certification to the first device by carrying the authorization certification in the first request information.

It is understandable that the authorization certification of the first network element may be generated in advance by the certification issuing device. Upon generating the authorization certification, the certification issuing device transmits the authorization certification back to the first network element or uploads the authorization certification to the blockchain node for distributed storage. Further, in the case that the first network element acquires data based on service needs, the first network element acquires the authorization certification from the local storage space, or requests the authorization certification from the blockchain node, and transmits the acquired authorization certification to the first device over the first request information. In this way, flexibility of data authorization performed by the first device is improved.

Approach 2

Figure 6:
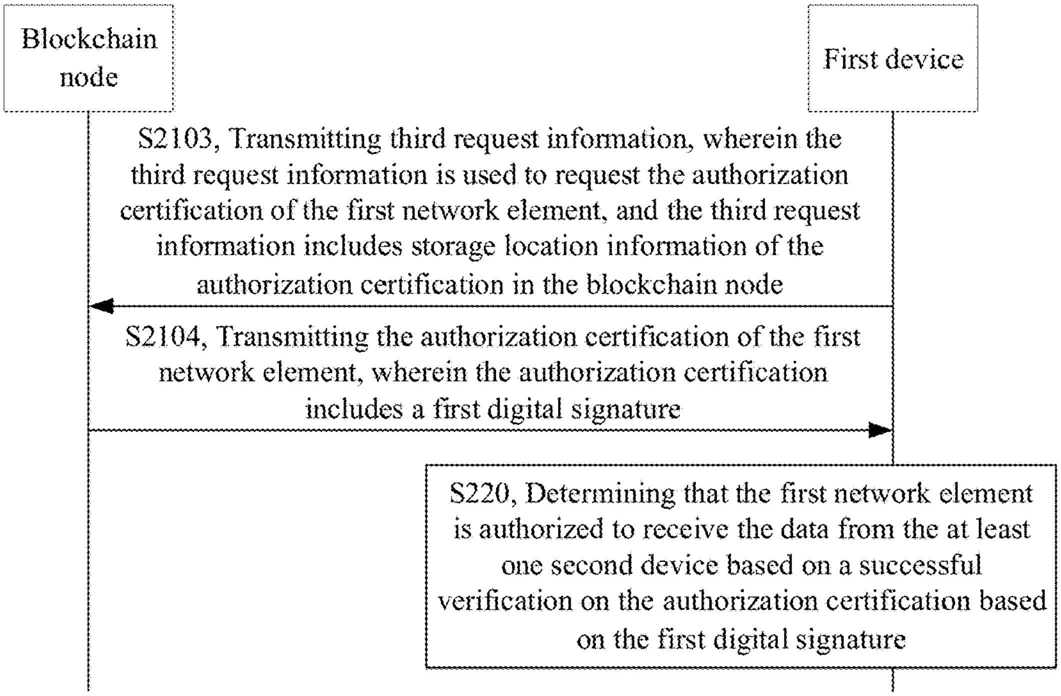
FIG. 6 is a fifth schematic flowchart of a method for implementing security according to some embodiments of the present disclosure.

In some embodiments of the present disclosure, referring to a schematic flowchart shown in FIG. 6, S210 in which the first device acquires the authorization certification of the first network element is implemented by the following processes.

In S2103, the first device transmits third request information to the blockchain node, wherein the third request information is used to request the authorization certification of the first network element, the authorization certification being stored in a block of the blockchain node, and the third request information includes storage location information of the authorization certification in the blockchain node.

In S2104, the first device receives the authorization certification of the first network element from the blockchain node.

It is understandable that the authorization certification of the first network element may be distributedly stored in the block of the blockchain node in a decentralized identity (DID) manner. The first device may actively request the authorization certification of the first network element from the blockchain node. For example, the first device requests the authorization certification of the first network element from the blockchain node based on the storage location information of the authorization certification of the first network element.

It should be noted that the storage location information of the authorization certification of the first network element may be acquired by the first device from an access network element (e.g., a base station) or a core network element, which is not limited in the embodiments of the present disclosure.

In some embodiments, the process that the first device actively requests the authorization certification of the first network element from the blockchain node for verification is triggered based on an interactive instruction received by a user interface, or triggered by an application program of the first device, or actively triggered by the first device upon acquiring the data of the second device that is bound/associated with the first device, which is not limited in the embodiments of the present disclosure.

In the embodiments of the present disclosure, the first device is triggered to periodically upload the data of the second device bound/associated with the first device. The periodic uploading of the data of the second device may be actively initiated by the first device, or triggered by interaction on a user interface, or triggered by an application program of the first device, which is not limited in the embodiments of the present disclosure.

Accordingly, upon being triggered to periodically upload the data, the first device actively requests the authorization certification of the first network element from the blockchain node. After the requested authorization certification is verified successfully, the second device bound/associated with the first device transmits the data periodically based on a predetermined time period. The data may be forwarded to the first network element over the first device, or transmitted directly to the first network element. The first device may actively request the authorization certification of the first network element from the blockchain node first, and then trigger the second device to upload the data periodically. The execution sequence of requesting the authorization certification of the first network element and triggering the second device to upload the data periodically is not limited in the embodiments of the present disclosure.

In the method for implementing security according to the embodiments of the present disclosure, the first device actively acquires and verifies the authorization certification of the first network element, and the second device only transmits the data based on a successful verification, thereby ensuring that the data of the second device is not leaked and stolen.

The process of generating the authorization certification is described in detail hereinafter.

Figure 7:
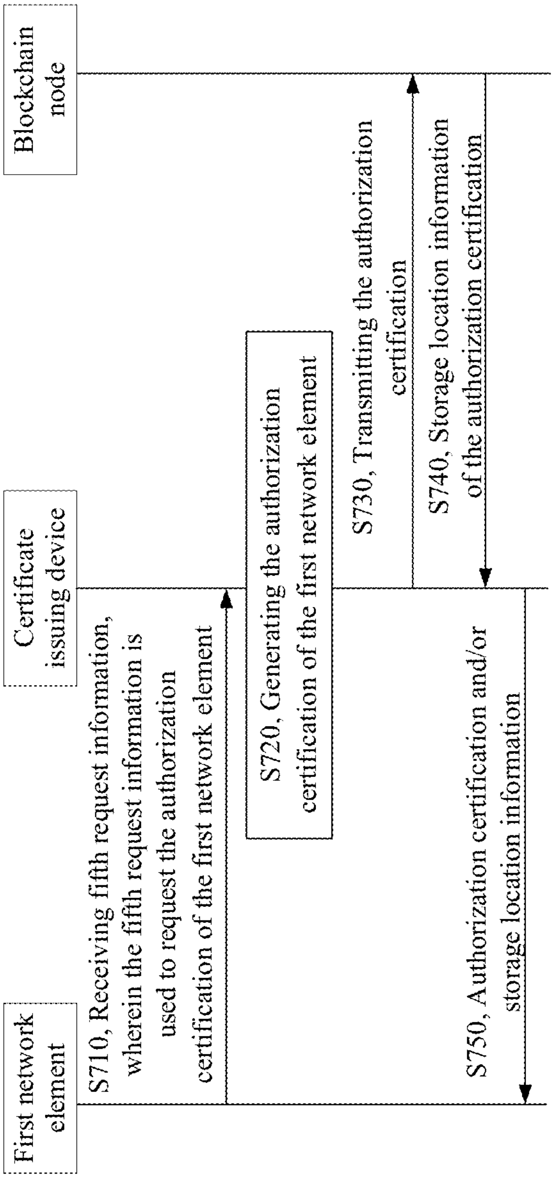
FIG. 7 is a sixth schematic flowchart of a method for implementing security according to some embodiments of the present disclosure.

In some embodiments of the present disclosure, referring to a schematic flowchart shown in FIG. 7, the method for implementing security provided in the embodiments of the present disclosure includes the following processes.

In S710, a certification issuing device receives fifth request information from a first network element, wherein the fifth request information is used to request an authorization certification of the first network element, the authorization certification being used for the first device to verify whether the first network element is authorized to acquire data, the data being originated from at least one second device associated with the first device.

In S720, the certification issuing device generates the authorization certification of the first network element.

The certification issuing device may be an application provider CA or an application server, which is not limited in the embodiments of the present disclosure.

It is understandable that the first network element may initiate a certification request to the certification issuance device prior to determining to acquire the data of the second device. For example, the first network element requests the certification issuing device to generate the authorization certification of the first network element by transmitting the fifth request information to the certification issuing device over a secure channel, and the first device determines whether to authorize the first network element to acquire the data of the second device by verifying the authorization certification.

In some embodiments, upon receiving the fifth request information, the certification issuing device determines whether the first network element transmitting the fifth request information is a trusted network element and whether the fifth request information is tampered with by verifying the identity of the first network element. The certification issuing device only generates the authorization certification of the first network element based on a successful verification on the identity of the first network element.

In some embodiments, the fifth request information includes at least one of: service identification information, identification information of the first network element, a public key of the first network element, data identification information, or a third digital signature. The third digital signature is acquired by signing information other than the third digital signature in the fifth request information with the private key of the first network element.

It is understandable that in the case that the fifth request information may include the third digital signature, the certification issuing device may verify the identity of the first network element based on the third digital signature. The certification issuing device verifies the identity of the first network element as follows.

The certification issuing device acquires third verification information by verifying the third digital signature using the public key of the first network element. In the case that the third verification information is consistent with information other than the third digital signature in the fifth request information, the certification issuing device determines that the identity of the first network element is verified successfully.

In some embodiments, the certification issuing device maintains a public key list, wherein the public key list stores identification information of a plurality of network elements and a public key corresponding to each of the plurality of network elements. Upon receiving the fifth request information from the first network element, the certification issuing device looks up the public key corresponding to the identification information of the first network element from the public key list, and then the certification issuing device acquires the third verification information by verifying the third digital signature based on the public key.

In some embodiments, in the case that the fifth request information includes the public key of the first network element, the certification issuing device acquires the third verification information by verifying the third digital signature based on the public key carried in the fifth request information. The method for verifying the identity of the first network element is not limited in the embodiments of the present disclosure.

It is understandable that in the case that the third verification information is consistent with the information other than the third digital signature in the fifth request information, the certification issuing device determines that the first network element is the trusted network element and the fifth request information is not tampered with. In the case that the third verification information is not consistent with the information other than the third digital signature in the fifth request information, the certification issuing device determines that the first network element is an untrusted network element, and/or the fifth request information is tampered with by a third party. In this case, the certification issuing device ignores the fifth request information and does not perform further processes.

In some embodiments, prior to generating the authorization certification of the first network element, the certification issuing device generates an RSA accumulator parameter $\alpha$ for the first network element. The RSA accumulator parameter $\alpha$ for the first network element is used to verify whether the authorization certification of the first network element is revoked.

In some embodiments, the authorization certification generated by the certification issuing device includes at least one of: service identification information, identification information of the certification issuing device, a public key of the certification issuing device, identification information of the first network element, a public key of the first network element, an RSA accumulator parameter corresponding to the first network element, data identification information, or a first digital signature. The first digital signature is acquired by the certification issuing device by signing information other than the first digital signature in the authorization certification with its private key.

In some embodiments, with reference to a schematic flowchart shown in FIG. 7, the certification issuing device further performs S730 and S740 upon generating the authorization certification of the first network element.

In S730, the certification issuing device transmits the authorization certification of the first network element to the blockchain node.

In S740, the certification issuing device receives the storage location information of the authorization certification from the blockchain node.

It is understandable that the certification issuing device may transmit the generated authorization certification of the first network element to the blockchain node and upload the authorization certification of the first network element to the blockchain, thereby storing the authorization certification in a distributed manner. In addition, upon receiving the authorization certification, the blockchain node may store the authorization certification in a storage block of the blockchain and feed the storage location information back to the certification issuance device.

In some embodiments, as shown in FIG. 7, the following processes are performed after S740.

In S750, the certification issuing device transmits the authorization certification and/or the storage location information to the first network element.

It is understandable that upon generating the authorization certification, the certification issuing device may transmit the generated authorization certification to a requesting party, i.e., the first network element. The certification issuing device may transmit the storage location information of the authorization certification in the storage block to the first network element, and the first network element may request the authorization certification from the blockchain node based on the storage location information in the case that the authorization certification is needed.

In summary, in the method for implementing security according to embodiments of the present disclosure, the certification generating device generates the authorization certification of the first network element upon the request from the first network element, and stores the authorization certification in the distributed manner. In this way, the first network element or the first device requests the authorization certification from the blockchain node for distributed verification, that is, data authorization is carried out in parallel for the same type of services in different geographic locations, thereby improving the efficiency of data authorization.

The embodiments of the present disclosure are described hereinafter in combination with specific application scenarios.

Application Scenario 1

Figure 8:
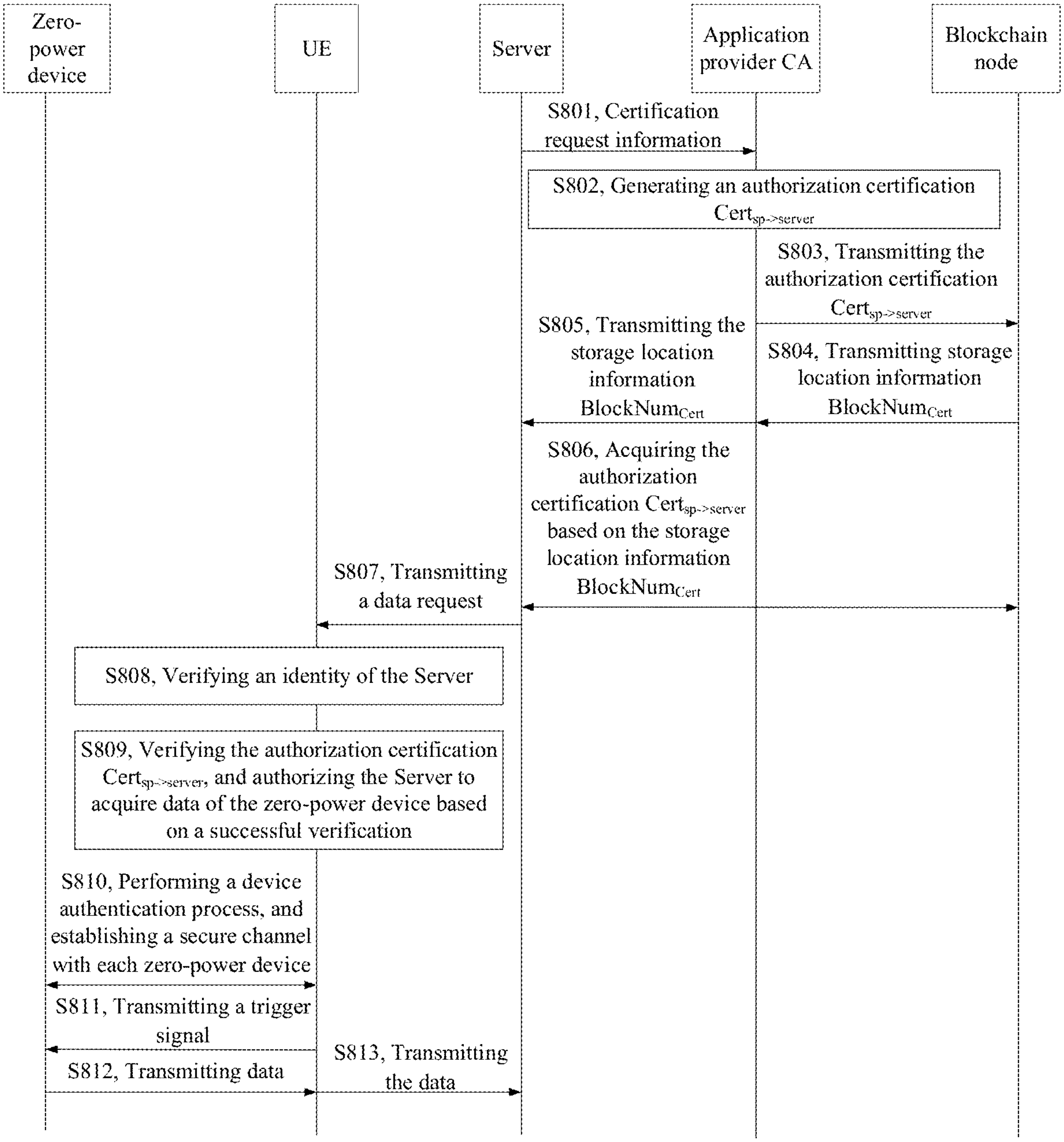
FIG. 8 is a schematic flowchart of a method for implementing security in a first application scenario according to some embodiments of the present disclosure.

In the application scenario 1, the first device is a UE, the second device is a zero-power device (ZPD), the first network element is an application server Server, and the certification issuance device is an application provider CA. Referring to a schematic flowchart shown in FIG. 8, the method for implementing security according to some embodiments of the present disclosure is implemented by the following processes.

In S801, the Server transmits certification request information to the application provider CA.

In some embodiments of the present disclosure, the certification request information is used to request an authorization certification of the Server. The certification request information can include at least one of $ID_{server}$, $pk_{server}$, $ID_{SP}$, $Type_{server}$, or $Sig_{server}$.

$ID_{server}$ represents the identification information of the Server, $pk_{server}$ represents a public key of the Server, $ID_{SP}$ represents the service identification information, $Type_{server}$ represents the data identification information, and $Sig_{server}$ represents the digital signature of the Server. $Sig_{server}$ is acquired by the Server by signing one or more of $ID_{server}$, $pk_{server}$, $ID_{SP}$, or $Type_{server}$ with its private key.

In S802, the application provider CA generates an authorization certification $Cert_{sp \rightarrow server}$ for the Server.

In some embodiments, upon receiving the certification request information, the application provider CA verifies an identity of the Server transmitting the request information.

For example, the application provider CA maintains a public key list, wherein the public key list stores IDs of a plurality of servers and a public key corresponding to each of the plurality of servers. The application provider CA checks whether $ID_{server}$ in the certification request information is in the public key list, and acquires the public key corresponding to $ID_{server}$ in the case that $ID_{server}$ is in the public key list.

Further, the application provider CA verifies $Sig_{server}$ in the certification request information using the public key corresponding to $ID_{server}$. In the case that a verification result is consistent with information other than $Sig_{server}$ in the certification request information, the application provider CA determines that the verification on the identity of the Server is successful.

It should be noted that the method for acquiring the public key list is not limited in the embodiments of present disclosure.

In some embodiments, the application provider CA generates the authorization certification of the Server based on content of the certification request information. The authorization certification is represented by $Cert_{sp\rightarrow server}$.

For example, $Cert_{sp\rightarrow server}$ includes at least one of $ID_{server}$, $pk_{server}$, $ID_{SP}$, $Type_{server}$, $pk_{SP}$, $\alpha_{server}$, or $Sig_{sp\rightarrow server}$.

$pk_{SP}$ represents a public key of the application provider CA, $\alpha_{server}$ represents an RSA accumulator parameter generated by the application provider CA for the Server, and $Sig_{sp\rightarrow server}$ is acquired by the application provider CA by signing one or more of $ID_{server}$, $pk_{server}$, $ID_{SP}$, $Type_{server}$, $pk_{SP}$, Or $\alpha_{server}$ with its private key.

In S803, the application provider CA transmits the authorization certification $Cert_{sp\rightarrow server}$ to a blockchain node.

In S804, the application provider CA receives storage location information $BlockNum_{Cert}$ from the blockchain node.

In S805, the application provider CA transmits the storage location information $BlockNum_{Cert}$ of the authorization certification to the Server.

In some embodiments, the application provider CA transmits the authorization certification $Cert_{sp\rightarrow server}$ to the Server directly.

In S806, the Server acquires the authorization certification $Cert_{sp\rightarrow server}$ from the blockchain node based on the storage location information $BlockNum_{Cert}$.

In some embodiments, the Server verifies the authenticity of the acquired authorization certification $Cert_{sp\rightarrow server}$ using the public key $pk_{SP}$ of the application provider CA. For example, the Server verifies $Sig_{sp\rightarrow server}$ in the authorization certification $Cert_{sp\rightarrow server}$ using $pk_{SP}$, and determines that the authorization certification is authentic in the case that a verification result is consistent with information other than $Sig_{sp\rightarrow server}$ in the authorization certification $Cert_{sp\rightarrow server}$.

In S807, the Server transmits a data request to the UE.

In some embodiments, the data request includes at least one of $ID_{server}$, $ID_{UE}$, $\{ID_{ZP1}, \ldots, ID_{ZPn}\}$, $pk_{server}$, g, $Cert_{sp\rightarrow server}$, or $Sig_{server}'$.

$ID_{UE}$ represents the identification information of the UE, and $ID_{ZP1}, \ldots, ID_{ZPn}$ represents the identification information of the respective zero-power devices ZP1 to ZPn bound to the UE, wherein n is an integer greater than 1.

It should be noted that the zero-power devices ZP1 to ZPn are all or some of the zero-power devices associated with the UE, which is not limited in the embodiments of the present disclosure.

Additionally, g represents a channel parameter, wherein g is used to establish a trusted channel between the Server and the UE. $Sig_{server}'$ is acquired by Server by signing one or more of $ID_{server}$, $ID_{UE}$, $pk_{server}$, $\{ID_{ZP1}, \ldots, ID_{ZPn}\}$, g, or $Cert_{sp\rightarrow server}$ with its private key.

In S808, the UE verifies an identity of the Server.

For example, the UE maintains a public key list, wherein the public key list stores identification information of a plurality of servers and a public key corresponding to each of the plurality of servers. Upon receiving the data request from the Server, the UE looks up the public key $pk_{server}$ corresponding to $ID_{server}$ from the public key list, and the UE verifies $Sig_{server}'$ based on $pk_{server}$. In the case that a verification result of the verification on $Sig_{server}'$ acquired by the UE based on $pk_{server}$ is consistent with information other than $Sig_{server}'$ in the data request, the UE determines that the Server is a trusted device. Otherwise, the UE determines that the verification is unsuccessful and does not perform further processes.

In S809, based on a successful verification on the identity of the Server, the UE verifies $Cert_{sp\rightarrow server}$, and authorizes the Server to acquire the data of the zero-power device based on a successful verification on $Cert_{sp\rightarrow server}$.

In some embodiments, the UE verifies $Cert_{sp\rightarrow server}$ based on the successful verification on the identity of the Server. For example, the UE verifies the digital signature $Sig_{sp\rightarrow server}$ in $Cert_{sp\rightarrow server}$ using the public key $pk_{SP}$ of the certification issuing device, and the UE determines that the Server is authorized to acquire the data of the zero-power device bound to the UE in the case that a verification result is consistent with information other than $Sig_{sp\rightarrow server}$ in the $Cert_{sp\rightarrow server}$. Otherwise, the UE does not perform further processes.

In some embodiments, in the case that $Cert_{sp\rightarrow server}$ includes the RSA accumulator parameter $\alpha_{server}$ of the Server, the UE verifies whether $Cert_{sp\rightarrow server}$ is revoked using the RSA accumulator parameter $\alpha_{server}$. In the case that $Cert_{sp\rightarrow server}$ is revoked, the UE does not perform further processes. In the case that $Cert_{sp\rightarrow server}$ is not revoked, the UE continues with S810.

In S810, the UE performs a device authentication with each zero-power device, and establishes a secure channel with each zero-power device.

In some embodiments, the UE performs the device authentication with each of the zero-power devices ZP1 . . . . ZPn based on the initial key K of each of the zero-power devices ZP1 . . . . ZPn. Alternatively, the UE acquires a physical layer security key s of each of the zero-power devices ZP1 . . . . ZPn by negotiating with each of the zero-power devices ZP1 . . . . ZPn based on the initial key K of each of the zero-power devices ZP1 . . . . ZPn, and then the UE performs the device authentication with each of the zero-power devices ZP1 . . . . ZPn based on the security key s.

In this way, after the UE and the zero-power devices ZP1 . . . . ZPn are successfully authenticated, the UE establishes a secure channel between the UE and each of the zero-power devices.

In S811, the UE transmits a trigger signal to each of the zero-power devices.

The UE can transmit the trigger signal to each of the zero-power devices over the secure channel established in S810 to trigger the zero-power device to transmit data.

In S812, the UE receives data from each of the zero-power devices.

Each zero-power device transmits the data to the UE over the secure channel established with the UE in S810.

In S813, the UE transmits the data of each of the zero-power devices to the Sever.

The UE can transmit the data of each of the zero-power devices to the Sever over a wireless access network.

It should be noted that S801 to S805 in the application scenario1 may be performed separately, and S806 to S813 may be performed separately, and S801 to S813 may be performed together, which are not limited in the embodiments of the present disclosure.

Figure 9:
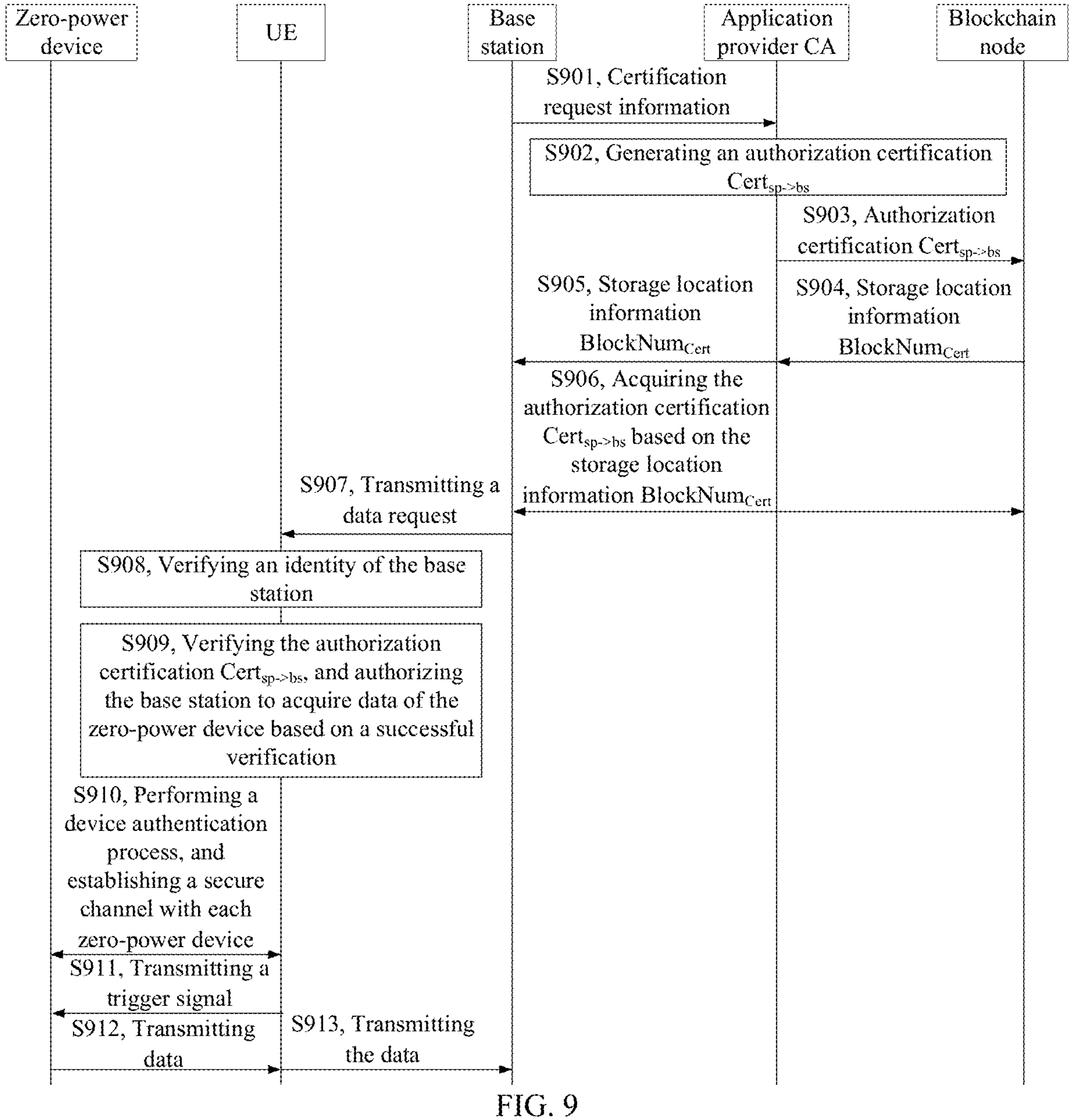
FIG. 9 is a first schematic flowchart of a method for implementing security in a second application scenario according to some embodiments of the present disclosure.

Application Scenario 2:

In the application scenario 2, the first device is a UE, the second device is a zero-power device (ZPD), the first network element is a base station, and the certification issuing device is an application provider CA. The certification issuing device issues an authorization certification of the base station individually. Referring to a schematic flowchart shown in FIG. 9, the process of issuing the authorization certification of the base station by the application provider CA may be implemented by the following processes.

In S901, the base station transmits certification request information to the application provider CA.

In some embodiments, the certification request information is used to request an authorization certification of the base station. The certification request information includes at least one of $ID_{bs}$, $pk_{bs}$, $ID_{SP}$, $Type_{bs}$, or $Sig_{bs}$.

IDbs represents identification information of the base station, $pk_{bs}$ represents a public key of the base station, the $ID_{SP}$ represents service identification information, $Type_{bs}$ represents data identification information, and $Sig_{bs}$ represents a digital signature of the base station. $Sig_{bs}$ is acquired by the base station by signing one or more of $ID_{bs}$, $pk_{bs}$, $ID_{SP}$, or $Type_{bs}$ with its private key.

In S902, the application provider CA generates the authorization certification of the base station.

In some embodiments, the application provider CA verifies an identity of the base station transmitting the request information.

For example, the application provider CA maintains a public key list, wherein the public key list stores the IDs of all base stations that use the service type of $ID_{SP}$ and the corresponding public keys. The application provider CA checks whether $ID_{bs}$ in the certification request information is in the public key list, and acquires the public key corresponding to $ID_{bs}$ in the case that $ID_{bs}$ is in the public key list.

Further, the application provider CA verifies $Sig_{bs}$ in the certification request information using the public key corresponding to $ID_{bs}$. In the case that a verification result is consistent with information other than $Sig_{bs}$ in the certification request information, the application provider CA determines that the identity of the base station authentication is verified successfully.

It should be noted that the method for acquiring the public key list is not limited in the embodiments of the present disclosure.

In some embodiments, the application provider CA generates the authorization certification of the base station based on content of the certification request information. The certification request information is represented by $Cert_{sp\rightarrow bs}$.

For example, $Cert_{sp\rightarrow bs}$ includes at least one of $ID_{bs}$, $pk_{bs}$, $ID_{SP}$, $Type_{sbs}$, $pk_{SP}$, $\alpha_{bs}$, or $Sig_{sp\rightarrow bs}$. $pk_{SP}$ represents a public key of the application provider CA, $\alpha_{bs}$ represents an RSA accumulator parameter generated by the application provider CA for the base station, and $Sig_{sp\rightarrow bs}$ is acquired by the application provider CA by signing one or more of $ID_{bs}$, $pk_{bs}$, $ID_{SP}$, $Type_{sbs}$, $pk_{SP}$, or abs with its private key.

In S903, the application provider CA transmits the authorization certification $Cert_{sp\rightarrow bs}$ to a blockchain node.

In S904, the application provider CA receives storage location information $BlockNum_{Cert}$ from the blockchain node.

In S905, the application provider CA transmits the storage location information $BlockNum_{Cert}$ of the authorization certification to the base station.

In some embodiments, the application provider CA transmits the authorization certification $Cert_{sp\rightarrow bs}$ to the base station directly.

In S906, the base station acquires the authorization certification $Cert_{sp\rightarrow bs}$ from the blockchain node based on the storage location information $BlockNum_{Cert}$.

In some embodiments, the base station verifies the authenticity of the acquired authorization certification $Cert_{sp\rightarrow bs}$ using the public key $pk_{SP}$ of the application provider CA. For example, the base station verifies $Sig_{sp\rightarrow bs}$ in the authorization certification $Cert_{sp\rightarrow bs}$ using $pk_{SP}$, and determines that the authorization certification is authentic in the case that a verification result is consistent with information other than $Sig_{sp\rightarrow bs}$ in the authorization certification $Cert_{sp\rightarrow bs}$.

In S907, the base station transmits a data request to the UE.

In some embodiments, the data request includes at least one of $ID_{bs}$, $ID_{UE}$, $\{ID_{ZP1}, \ldots, ID_{ZPn}\}$, $pk_{bs}$, g, $Cert_{sp\rightarrow bs}$, or $Sig_{bs}'$.

$ID_{UE}$ is the identification information of the UE, $ID_{ZP1}, \ldots, ID_{ZPn}$ are the identification information of the respective n zero-power devices ZP1 to ZPn bound to the UE, wherein n is an integer greater than 1.

It should be noted that the zero-power devices ZP1 to ZPn may be some or all of the zero-power devices bound to the UE, which is not limited in the embodiments of the present disclosure.

In addition, g represents a channel parameter for establishing a trusted channel between the base station and the UE. Sighs' is acquired by the base station by signing one or more of $ID_{bs}$, $ID_{UE}$, $pk_{bs}$, $\{ID_{ZP1}, \ldots, ID_{ZPn}\}$, g, or $Cert_{sp\rightarrow bs}$ with its private key.

In S908, the UE verifies an identity of the base station.

For example, the UE maintains a public key list, wherein the public key list stores identification information of a plurality of base stations and a public key corresponding to each of the plurality of base stations. Upon receiving a data request from the base station, the UE looks up the public key $pk_{bs}$ corresponding to $ID_{bs}$ from the public key list, and the UE verifies $Sig_{bs}$ based on $pk_{bs}$. In the case that a verification result of the verification on $Sig_{bs}$ acquired by the UE based on $pk_{bs}$ is consistent with information other than $Sig_{bs}$ in the data request, the UE determines that the base station is a trusted device. Otherwise, the UE determines that the verification is not successful and does not perform further processes.

In S909, based on a successful verification on the identity of the base station, the UE verifies $Cert_{sp\rightarrow bs}$, and authorizes the base station to acquire the data of the zero-power device based on a successful verification on $Cert_{sp\rightarrow bs}$.

In some embodiments, based on the successful verification on the identity of the base station, the UE further verifies $Cert_{sp\rightarrow bs}$. For example, the UE verifies the digital signature $Sig_{sp\rightarrow bs}$ in $Cert_{sp\rightarrow bs}$ using the public key $pk_{SP}$ of the certification issuing device. In the case that a verification result is consistent with information other than $Sig_{sp\rightarrow bs}$ in $Cert_{sp\rightarrow bs}$, the UE determines that the base station is authorized to acquire the zero-power device data bound to the UE. In the case that the verification result is inconsistent with the information other than $Sig_{sp\rightarrow bs}$ in $Cert_{sp\rightarrow bs}$, the UE does not perform further processes.

In some embodiments, in the case that $Cert_{sp\rightarrow bs}$ includes an RSA accumulator parameter $\alpha_{bs}$ of the base station, the UE verifies whether $Cert_{sp\rightarrow bs}$ is revoked using $\alpha_{bs}$. In the case that $_{\rightarrow bs}$ is revoked, the UE does not perform further processes. In the case that $Cert_{sp\rightarrow bs}$ is not revoked, the UE continues to perform S910.

In S910, the UE performs a device authentication with each zero-power device, and establishes a secure channel with each zero-power device.

In some embodiments, the UE performs the device authentication with each of the zero-power devices ZP1 . . . . ZPn based on the initial key K of each of the zero-power devices ZP1 . . . . ZPn. Alternatively, the UE acquires a physical layer security key s of each of the zero-power devices ZP1 . . . . ZPn by negotiating with each of the zero-power devices ZP1 . . . . ZPn based on the initial key K of each of the zero-power devices ZP1 . . . . ZPn, and then the UE performs the device authentication with each of the zero-power devices ZP1 . . . . ZPn based on the security key s. After the UE and the zero-power devices ZP1 . . . . ZPn are successfully authenticated, the UE establishes a secure channel between the UE and each of the zero-power devices.

In S911, the UE transmits a trigger signal to each of the zero-power devices.

The UE can transmit the trigger signal to each of the zero-power devices over the secure channel established in S910 to trigger each of the zero-power devices to transmit data.

In S912, the UE receives data from each of the zero-power devices.

Each of the zero-power devices may transmit the data to the UE over the secure channel established with the UE in S810.

In S913, the UE transmits the data of each of the zero-power devices to the base station.

Figure 10:
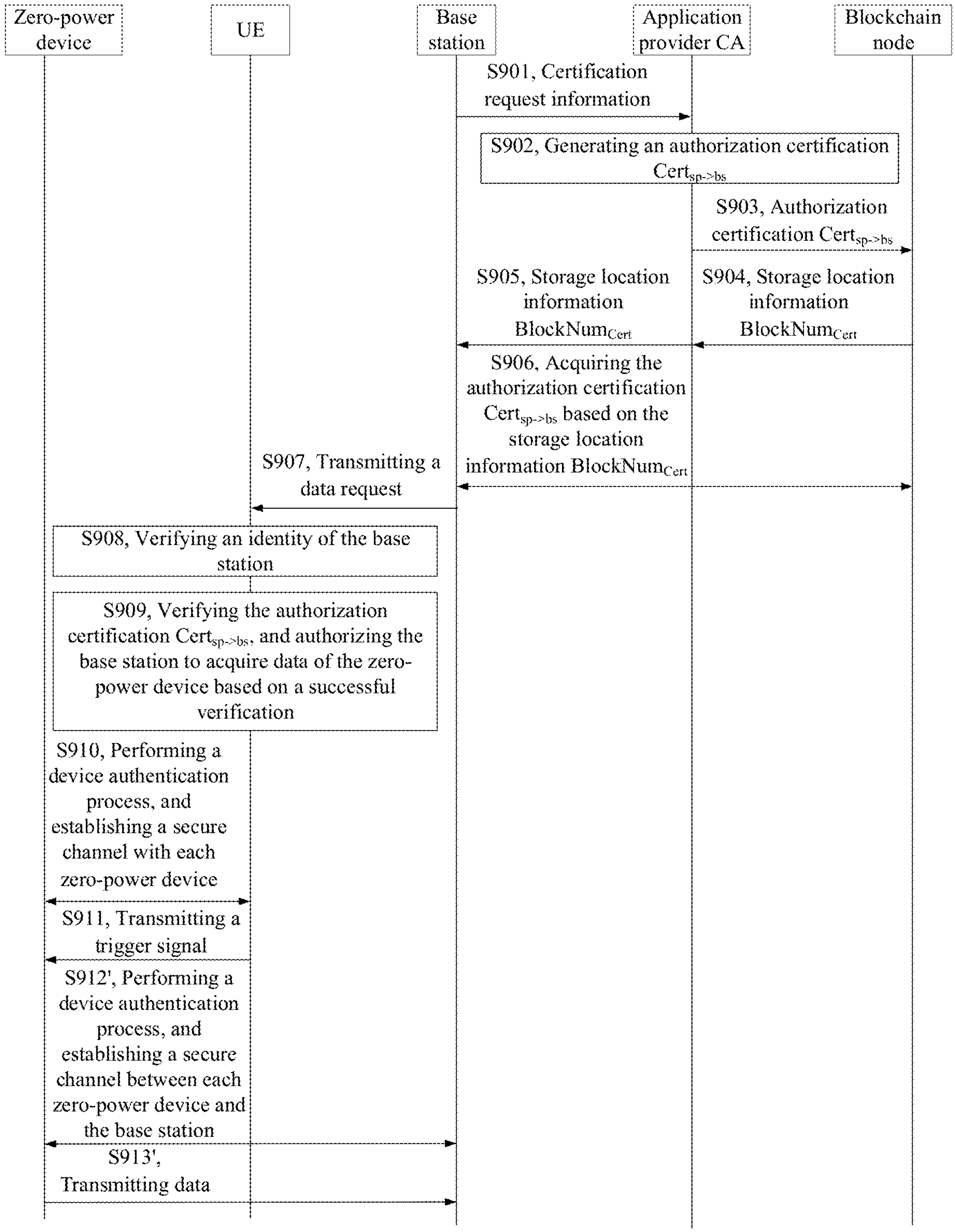
FIG. 10 is a second schematic flowchart of a method for implementing security in the second application scenario according to some embodiments of the present disclosure.

In some embodiments, referring to a schematic flowchart shown in FIGS. 10, S912 and S913 may be replaced with the following processes.

In S912', each zero-power device and the base station perform a device authentication with each other, and establish a secure channel between the zero-power device and the base station.

In some embodiments, the base station performs the device authentication with each of the zero-power devices ZP1 . . . . ZPn based on the initial key K of each of the zero-power devices ZP1 . . . . ZPn. Alternatively, the base station acquires a physical layer security key s of each of the zero-power devices ZP1 . . . . ZPn by negotiating with each of the zero-power devices ZP1 . . . . ZPn based on the initial key K of each of the ZP1 . . . . ZPn, and then the base station performs the device authentication with each of the zero-power devices ZP1 . . . . ZPn based on the security key s.

In this way, in the case that the base station and the zero-power devices ZP1 . . . . ZPn are successfully authenticated, the base station establishes a secure channel between the base station and each of the zero-power devices ZP1 . . . . ZPn.

In S913', each of the zero-power devices transmits data to the base station.

Each of the zero-power devices ZP1 . . . . ZPn may transmit the data to the base station over the secure channel established in S912'.

It should be noted that, in the application scenario 2, S901 to S905 may be performed separately, S906 to S913 or S906 to S913' may be performed separately, S901 to S913 or S901 to S913' may be performed together, which are not limited in the embodiments of the present disclosure.

Application Scenario 3

Figure 11:
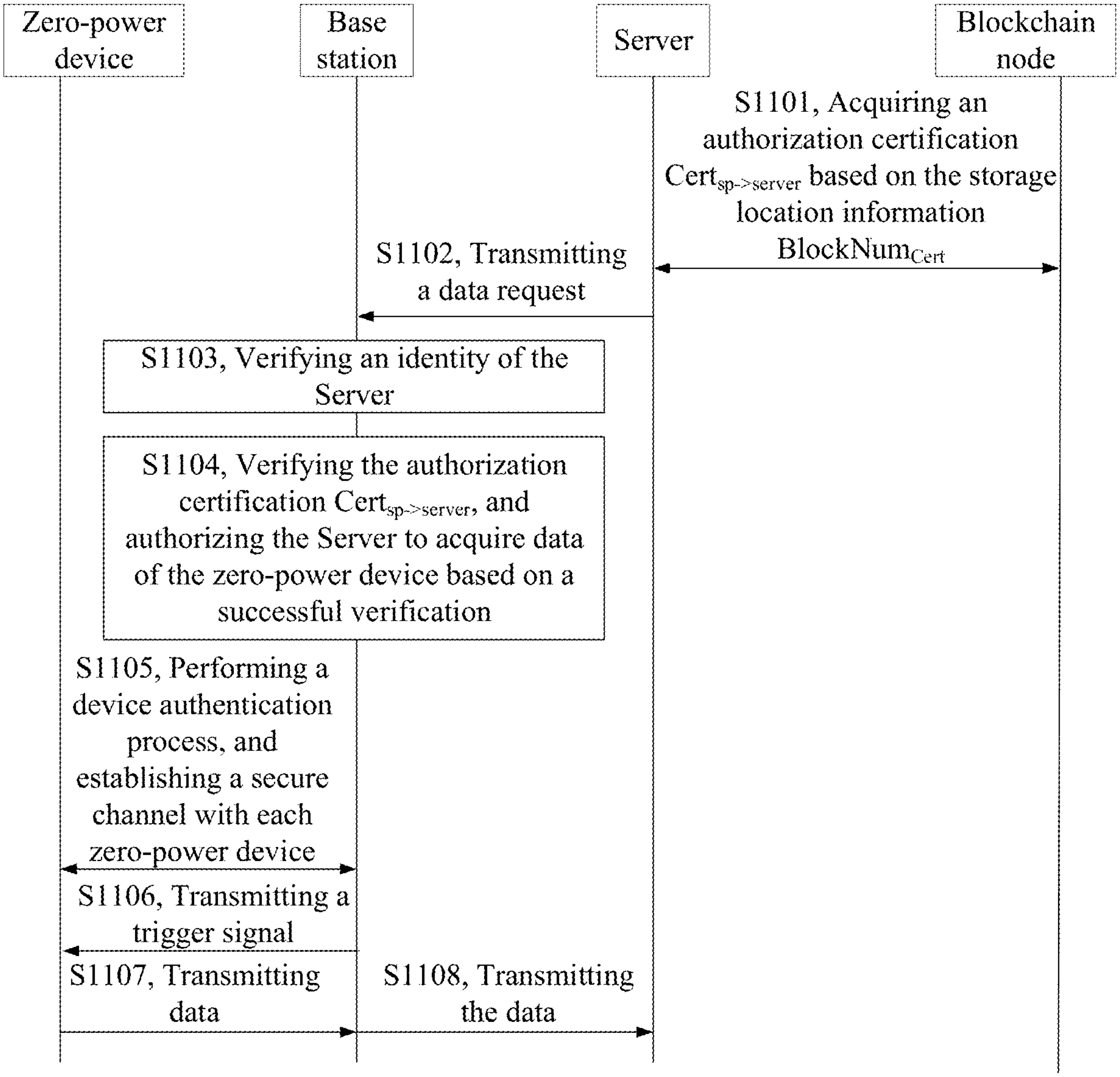
FIG. 11 is a schematic flowchart of a method for implementing security in a third application scenario according to some embodiments of the present disclosure.

In the application scenario 3, the first device is a base station, the second device is a zero-power device (ZPD), the first network element is an application server Server, and the certification issuing device is an application provider CA. Referring to a schematic flowchart shown in FIG. 11, the method for implementing security according to some embodiments of the present disclosure is performed by the following processes.

In S1101, the Server acquires an authorization certification $Cert_{sp\rightarrow server}$ from a blockchain node based on storage location information $BlockNum_{Cert}$.

In some embodiments, the Server verifies the authenticity of the acquired authorization certification $Cert_{sp\rightarrow server}$ using a public key $pk_{SP}$ of the application provider CA. For example, the Server verifies $Sig_{sp\rightarrow server}$ in the authorization certification $Cert_{sp\rightarrow server}$ using $pk_{SP}$, and determines that the authorization certification is authentic in the case that a verification result is consistent with information other than $Sig_{sp\rightarrow server}$ in the authorization certification $Cert_{sp\rightarrow server}$.

In S1102, the Server transmits a data request to the base station.

In some embodiments, the data request includes at least one of $ID_{server}$, $ID_{bs}$, $\{ID_{ZP1}, \ldots, ID_{ZPn}\}$, $pk_{server}$, g, $Cert_{sp\rightarrow server}$, or $Sig_{server}'$.

$ID_{bs}$ represents the identification information of the base station, $ID_{ZP1}, \ldots, ID_{ZPn}$ represents the identification information of n zero-power devices ZP1 to ZPn bound to the base station, wherein n is an integer greater than 1.

It should be noted that the zero-power devices ZP1 to ZPn are some or all of the zero-power devices associated with the base station, which is not limited in the embodiments of the present disclosure.

In addition, g represents a channel parameter for establishing a trusted channel between the Server and the base station. $Sig_{server}'$ is acquired by the Server by signing one or more of $ID_{server}$, $ID_{bs}$, $pk_{server}$, $\{ID_{ZP1}, \ldots, ID_{ZPn}\}$, g, or $Cert_{sp\rightarrow server}$ with its private key.

In S1103, the base station verifies an identity of the Server.

For example, the base station maintains a public key list, wherein the public key list stores identification information of a plurality of servers and a public key corresponding to each of the plurality of servers. Upon receiving a data request from the Server, the base station looks up the public key $pk_{server}$ corresponding to $ID_{server}$ from the public key list, and the base station verifies $Sig_{server}'$ based on $pk_{server}$. In the case that a verification result of the verification on $Sig_{server}'$ acquired by the base station based on $pk_{server}$ is consistent with information other than $Sig_{server}'$ in the data request, the base station determines that the Server is a trusted device. Otherwise, the base station determines that the verification is unsuccessful and does not perform further processes.

In S1104, based on a successful verification on the identity of the Server, the base station verifies $Cert_{sp\rightarrow server}$, and authorize the Server to acquire the data of the zero-power device based on a successful verification on $Cert_{sp \rightarrow server}$.

In some embodiments, based on the successful verification on the identity of the Server, the base station further verifies $Cert_{sp \rightarrow server}$. For example, the base station verifies the digital signature $Sig_{sp \rightarrow server}$ in $Cert_{sp \rightarrow server}$ using the public key $pk_{SP}$ of the certification issuing device. In the case that a verification result is consistent with information other than $Sig_{sp \rightarrow server}$ in $Cert_{sp \rightarrow server}$, the base station determines that the Server is authorized to acquire the data of a plurality of zero-power devices bound to the base station. In the case that the verification result is inconsistent with the information other than $Sig_{sp \rightarrow server}$ in $Cert_{sp \rightarrow server}$, the base station does not perform further processes.

In some embodiments, in the case that $Cert_{sp \rightarrow server}$ includes an RSA accumulator parameter $\alpha_{server}$ of the Server, the base station verifies whether $Cert_{sp \rightarrow server}$ is revoked using the $\alpha_{server}$. In the case that $Cert_{sp \rightarrow server}$ is revoked, the base station does not perform further processes. In the case that $Cert_{sp \rightarrow server}$ is not revoked, the base station continues to perform S1105.

In S1105, the base station performs a device authentication with each zero-power device, and establishes a secure channel with each zero-power device.

In some embodiments, the base station performs the device authentication with each of the zero-power devices ZP1 . . . . ZPn based on the initial key K of each of the zero-power devices ZP1 . . . . ZPn. Alternatively, the base station acquires a physical layer security key s of each of the zero-power devices ZP1 . . . . ZPn by negotiating with each of the zero-power devices ZP1 . . . . ZPn based on the initial key K of each of the zero-power devices ZP1 . . . . ZPn, and then the base station performs the device authentication with each of the zero-power devices ZP1 . . . . ZPn based on the security key s.

In the case that the base station and the zero-power devices ZP1 . . . . ZPn are successfully authenticated, the base station establishes a secure channel between the base station and each of the zero-power devices ZP1 . . . . ZPn.

In S1106, the base station transmits a trigger signal to each of the zero-power devices.

The base station transmits the trigger signal to each of the zero-power devices over the secure channel established in S1105 to trigger each of the zero-power devices to transmit data.

In S1107, the base station receives the data from each of the zero-power devices.

Each of the zero-power devices transmits the data to the base station over the secure channel established with the base station in S1105.

In S1108, the base station transmits the data of each of the zero-power devices to the Sever.

Application Scenario 4

Figure 12:
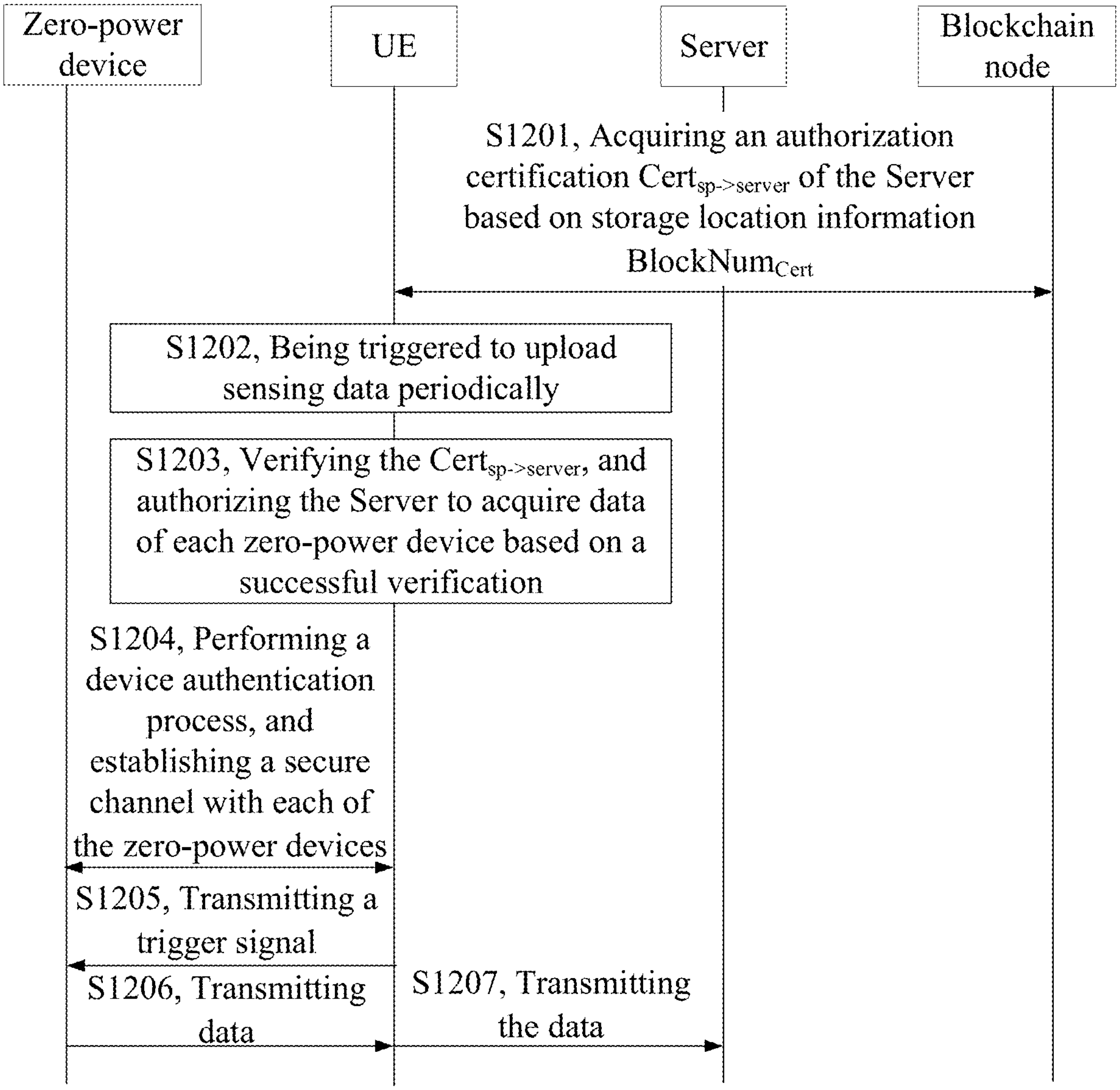
FIG. 12 is a first schematic flowchart of a method for implementing security in a fourth application scenario according to some embodiments of the present disclosure.

In the application scenario 4, the first device is a UE, the second device is a zero-power device (ZPD), the first network element is an application server Server, and the certification issuing device is an application provider CA. With reference to a schematic flowchart shown in FIG. 12, the method for implementing security according to some embodiments of the present disclosure is performed by the following processes.

In S1201, the UE acquires an authorization certification $Cert_{sp \rightarrow server}$ of the Server from a blockchain node based on storage location information $BlockNum_{Cert}$.

In some embodiments, the UE verifies the authenticity of the acquired authorization certification using a public key $pk_{SP}$ of the application provider CA. For example, the UE verifies $Sig_{sp \rightarrow server}$ in the authorization certification $Cert_{sp \rightarrow server}$ using $pk_{SP}$. In the case that a verification result is consistent with information other than $Sig_{sp \rightarrow server}$ in the authorization certification $Cert_{sp \rightarrow server}$, the UE determines that the authorization certification is authentic.

In S1202, the UE is triggered to upload data periodically.

It should be noted that S1201 may be executed prior to S1202 or upon S1202. The execution sequence of S1201 and S1202 is not limited in the embodiments of the present disclosure.

In S1203, the UE verifies $Cert_{sp \rightarrow server}$, and authorizes the Server to acquire the data of each zero-power device based on a successful verification.

For example, the UE verifies the digital signature $Sig_{sp \rightarrow server}$ in $Cert_{sp \rightarrow server}$ using the public key $pk_{SP}$ of the certification issuing device. In the case that a verification result is consistent with information other than $Sig_{sp \rightarrow server}$ in $Cert_{sp \rightarrow server}$, the UE determines that the Server is authorized to acquire the data of the zero-power devices ZP1 . . . . ZPn. In the case that the verification result is inconsistent with the information other than $Sig_{sp \rightarrow server}$ in $Cert_{sp \rightarrow server}$, the UE does not perform further processes.

In some embodiments, in the case that $Cert_{sp \rightarrow server}$ includes an RSA accumulator parameter «server of the Server, the UE verifies whether $Cert_{sp \rightarrow server}$ is revoked using a server. In the case that $Cert_{sp \rightarrow server}$ is revoked, the UE does not perform further processes. In the case that $Cert_{sp \rightarrow server}$ is not revoked, the UE continues to perform S1204.

In S1204, the UE performs a device authentication with each of the zero-power devices, and establishes a secure channel with each of the zero-power devices.

In some embodiments, the UE performs the device authentication with each of the zero-power devices ZP1 . . . . ZPn based on the initial key K of each of the zero-power devices ZP1 . . . . ZPn. Alternatively, the UE acquires a physical layer security key s of each of the zero-power devices ZP1 . . . . ZPn by negotiating with each of the zero-power devices ZP1 . . . . ZPn based on the initial key K of each of the zero-power devices ZP1 . . . . ZPn, and then the UE performs the device authentication with each of the zero-power devices ZP1 . . . . ZPn based on the security key s.

In the case that the UE and the zero-power devices ZP1 . . . . ZPn are successfully authenticated, the UE establishes a secure channel between the UE and each of the zero-power devices ZP1 . . . . ZPn.

In S1205, the UE transmits a trigger signal to each of the zero-power devices.

The UE may transmit the trigger signal to each of the zero-power devices over the secure channel established in S1204 to trigger each of the zero-power devices to transmit data.

In S1206, the UE receives data from each of the zero-power devices.

Each of the zero-power devices may transmit the data to the UE over the secure channel established with the UE in S1204.

In S1207, the UE transmits the data of each of the zero-power devices to the Server.

The UE may transmit the data of each of the zero-power devices to the Server over a wireless access network.

Figure 13:
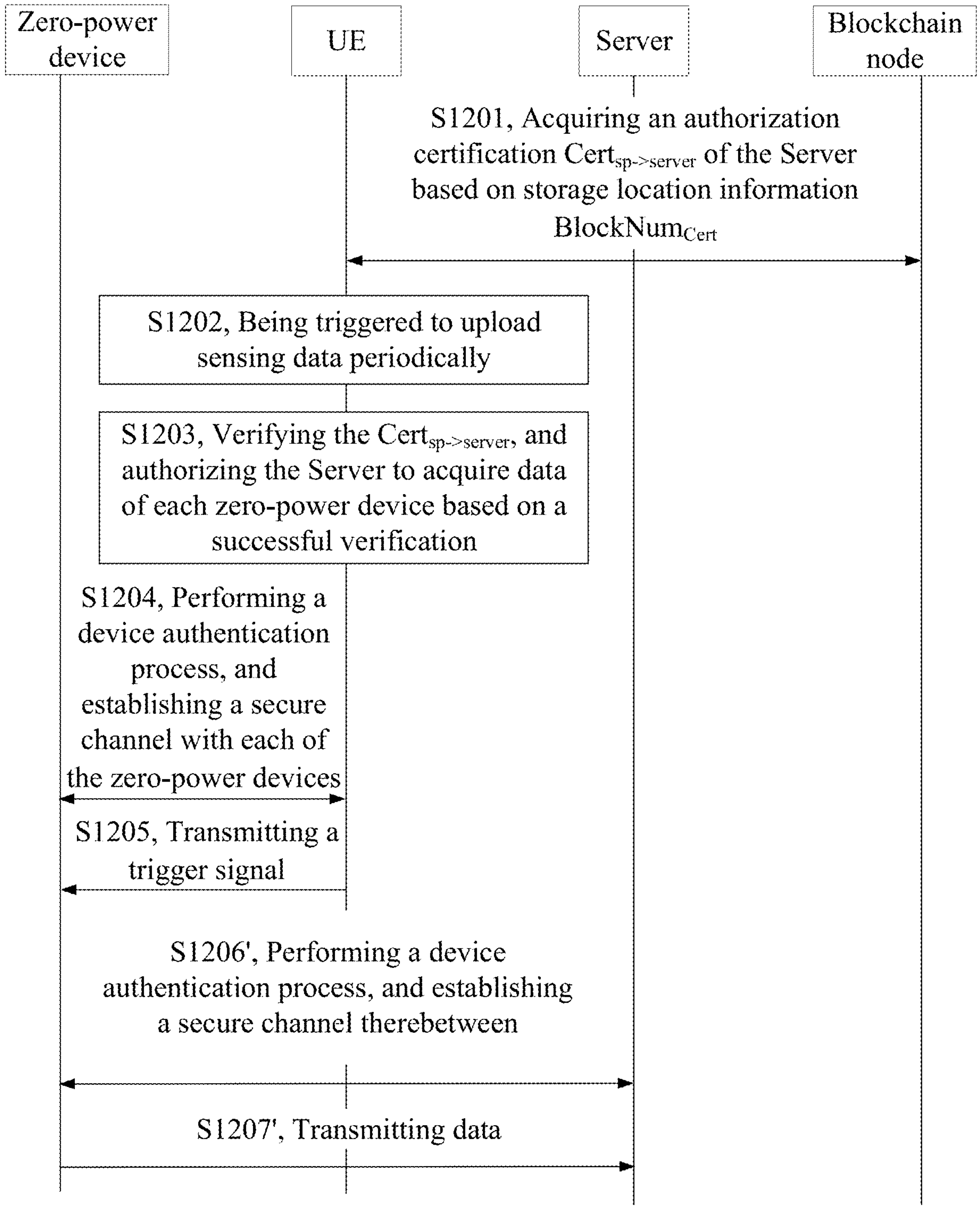
FIG. 13 is a second schematic flowchart of a method for implementing security in the fourth application scenario according to some embodiments of the present disclosure.

In some embodiments, referring to a schematic flowchart shown in FIGS. 13, S1206 and S1207 may be replaced with the following processes.

In S1206', each of the zero-power devices and the Server perform a device authentication to establish a secure channel therebetween.

In some embodiments, the Server performs the device authentication with each of the zero-power devices ZP1 . . . . ZPn based on the initial key K of each of the zero-power devices ZP1 . . . . ZPn. Alternatively, the Server acquires a physical layer security key s of each of the zero-power devices ZP1 . . . . ZPn by negotiating with each of the zero-power devices ZP1 . . . . ZPn based on the initial key K of each of the zero-power devices ZP1 . . . . ZPn, and then the Server performs the device authentication with each of the zero-power devices ZP1 . . . . ZPn based on the security key s.

After the Server and the zero-power devices ZP1 . . . . ZPn are successfully authenticated, the Server establishes a secure channel between the Server and each of the zero-power devices ZP1 . . . . ZPn.

In S1207', each of the zero-power devices transmits data to the Server.

Each of the zero-power devices ZP1 . . . . ZPn may transmit data to the Server over the secure channel established in S1206'.

In some embodiments, the Server in the application scenario 4 is replaced with a base station, and accordingly, $Cert_{sp\rightarrow server}$ is replaced with $Cert_{sp\rightarrow bs}$.

Application Scenario 5

Figure 14:
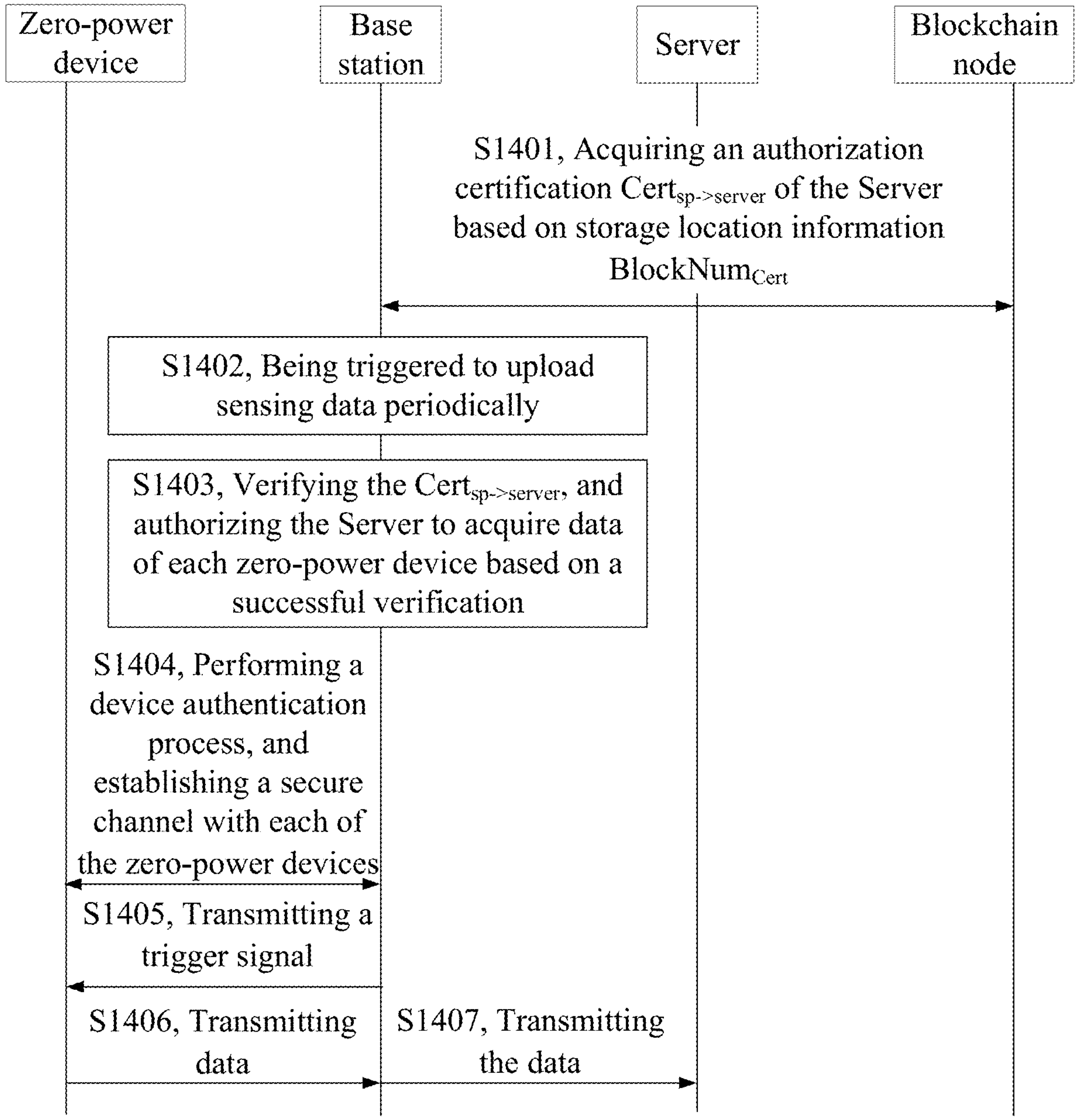
FIG. 14 is a first schematic flowchart of a method for implementing security in a fifth application scenario according to some embodiments of the present disclosure.

In the application scenario 5, the first device is a base station, the second device is a zero-power device (ZPD), the first network element is an application server Server, and the certification issuing device is an application provider CA. With reference to a schematic flowchart shown in FIG. 14, the method for implementing security according to some embodiments of the present disclosure is performed by the following processes.

In S1401, the base station acquires an authorization certification $Cert_{sp\rightarrow server}$ of the Server from a blockchain node based on storage location information $BlockNum_{Cert}$.

In some embodiments, the base station verifies the authenticity of the acquired authorization certification using a public key $pk_{SP}$ of the application provider CA. For example, the base station verifies $Sig_{sp\rightarrow server}$ in the authorization certification $Cert_{sp\rightarrow server}$ using $pk_{SP}$. In the case that a verification result is consistent with information other than the $Sig_{sp\rightarrow server}$ in the authorization certification $Cert_{sp\rightarrow server}$, the base station determines that the authorization certification is authentic.

In S1402, the base station is triggered to upload data periodically.

It should be noted that S1401 may be executed prior to S1402 or upon S1402. The execution sequence of S1401 and S1402 is not limited in the embodiments of the present disclosure.

In S1403, the base station verifies $Cert_{sp\rightarrow server}$, and authorizes the Server to acquire data of each zero-power device based on a successful verification.

For example, the base station verifies the digital signature $Sig_{sp\rightarrow server}$ in $Cert_{sp\rightarrow server}$ using a public key $pk_{SP}$ of the certification issuing device. In the case that a verification result is consistent with information other than $Sig_{sp\rightarrow server}$ in $Cert_{sp\rightarrow server}$, the base station determines that the Server is authorized to acquire data of the zero-power devices ZP1 . . . . ZPn. In the case that the verification result is inconsistent with the information other than $Sig_{sp\rightarrow server}$ in $Cert_{sp\rightarrow server}$, the base station does not perform further processes.

In some embodiments, in the case $Cert_{sp\rightarrow server}$ includes an RSA accumulator parameter $\alpha_{server}$ of the Server, the base station verifies whether $Cert_{sp\rightarrow server}$ is revoked using $\alpha_{server}$. In the case that $Cert_{sp\rightarrow server}$ is revoked, the base station does not perform further processes. In the case that $Cert_{sp\rightarrow server}$ is not revoked, the base station continues to perform S1404.

In S1404, the base station performs a device authentication with each of the zero-power devices, and establishes a secure channel with each of the zero-power devices.

In some embodiments, the base station performs the device authentication with each of the zero-power devices ZP1 . . . . ZPn based on the initial key K of each of the zero-power devices ZP1 . . . . ZPn. Alternatively, the base station acquires a physical layer security key s of each of the zero-power devices ZP1 . . . . ZPn by negotiating with each of the zero-power devices ZP1 . . . . ZPn based on the initial key K of each of the zero-power devices ZP1 . . . . ZPn, and then the base station performs the device authentication with each of the zero-power devices ZP1 . . . . ZPn based on the security key s. After the base station and the zero-power devices ZP1 . . . . ZPn are successfully authenticated, the base station establishes a secure channel between the base station and each of the zero-power devices ZP1 . . . . ZPn.

In S1405, the base station transmits a trigger signal to each of the zero-power devices. The base station transmits the trigger signal to each of the zero-power devices over the secure channel established in S1404 to trigger each of the zero-power devices to transmit data.

In S1406, the base station receives data from each of the zero-power devices. Each of the zero-power devices transmits the data to the base station over the secure channel established with the base station in S1404.

In S1407, the base station transmits the data of each of the zero-power devices to the Sever.

Figure 15:
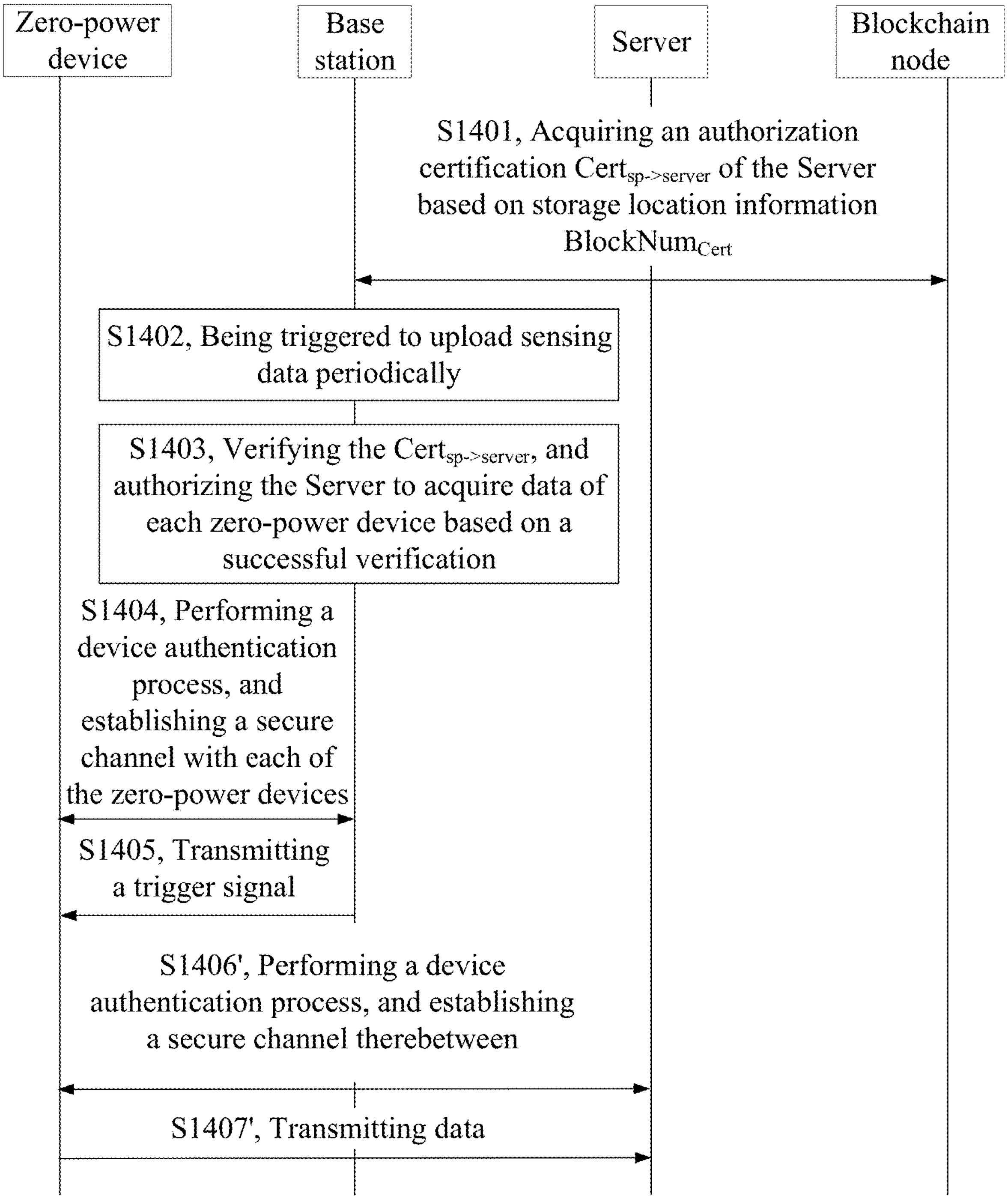
FIG. 15 is a second schematic flowchart of a method for implementing security in the fifth application scenario according to some embodiments of the present disclosure.

In some embodiments, referring to a schematic flowchart shown in FIGS. 15, S1406 and S1407 may be replaced with the following processes.

In S1406', each of the zero-power devices and the Server perform a device authentication, and establishes a secure channel therebetween. In some embodiments, the Server performs the device authentication with each of the zero-power devices ZP1 . . . . ZPn based on the initial key K of each of the zero-power devices ZP1 . . . . ZPn. Alternatively, the Server acquires a physical layer security key s of each of the zero-power devices by negotiating with each of the zero-power devices ZP1 . . . . ZPn based on the initial key K of each of the zero-power devices ZP1 . . . . ZPn, and then the Server performs the device authentication with each of the zero-power devices ZP1 . . . . ZPn based on the security key s. After the Server and the zero-power devices ZP1 . . . . ZPn are successfully authenticated, the Server establishes a secure channel between the Server and each of the zero-power device ZP1 . . . . ZPn.

In S1407', each of the zero-power devices transmits data to the Server.

Each of the zero-power devices ZP1 . . . . ZPn may transmit data to the Server over the secure channel established in S1406'.

Some embodiments of the present disclosure are described in detail hereinabove in conjunction with the accompany drawings. However, the present disclosure is not limited to specific details in the above embodiments. A variety of simple variations within the scope of the technical concept of the present disclosure may be made on the technical solutions according to the present disclosure, and the simple variations are within the protection scope of the present disclosure. For example, the specific technical features described in the above specific embodiments may be combined in any suitable way without contradiction, and various possible combinations are not described in the present disclosure to avoid unnecessary repetition. For example, different embodiments of the present disclosure may also be combined arbitrarily, as long as the idea of the present disclosure is not contradicted, which shall also be regarded as the content disclosed in the present disclosure. For example, the embodiments described in the present disclosure and/or the technical features in the embodiments can be arbitrarily combined with the existing technologies without conflict, and the technical solution acquired by combination shall also fall within the protection scope of the present disclosure.

It is understandable that in the method embodiments of the present disclosure, sequence numbers of the above processes do not mean the execution order, which shall be determined by their functions and internal logic and shall not limit implementation processes of the embodiments of the present disclosure. In addition, the symbol "/" generally indicates an "or" relationship between the associated objects.

Figure 16:
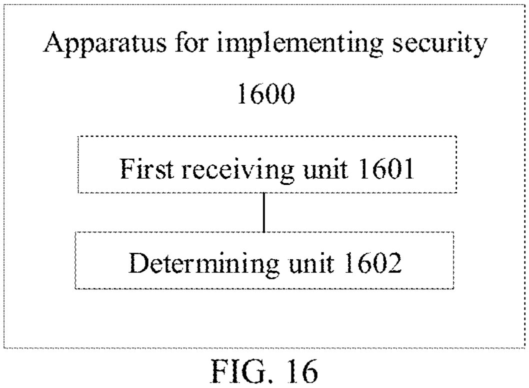
FIG. 16 is a schematic structural diagram of an apparatus 1600 for implementing security according to some embodiments of the present disclosure.

FIG. 16 is a schematic structural diagram of an apparatus 1600 for implementing security according to some embodiments of the present disclosure. The apparatus 1600 is applicable to the first device. As shown in FIG. 16, the apparatus 1600 for implementing security includes:

a first receiving unit 1601, used to acquire an authorization certification of a first network element, wherein the authorization certification is used to verify whether the first network element is authorized to receive data, the data being originated from at least one second device associated with the first device, and the authorization certification includes a first digital signature; and a determining unit 1602, used to determine that the first network element is authorized to receive the data from the at least one second device based on a successful verification on the authorization certification based on the first digital signature.

In some embodiments, the authorization certification includes at least one of: service identification information, a public key of a certification issuing device, identification information of the first network element, a public key of the first network element, an RSA accumulator parameter corresponding to the first network element, or data identification information; wherein the service identification information indicates a service type of the data.

In some embodiments, the first digital signature is acquired by signing with a private key of the certification issuing device, and accordingly, the apparatus 1600 for implementing security further includes a first verifying unit. The first verifying unit is used to acquire first verification information by verifying the first digital signature using the public key of the certification issuing device, and determine that the authorization certification is verified successfully in the case that the first verification information is consistent with information other than the first digital signature in the authorization certification.

In some embodiments, the authorization certification includes the RSA accumulator parameter corresponding to the first network element; and accordingly, the first verifying unit is further used to verify whether the authorization certification is revoked based on the RSA accumulator parameter, based on a successful verification on the authorization certification based on the first digital signature; and the determining unit 1602 is further used to determine that the first network element is authorized to receive the data of the at least one second device in the case that the authorization certification is not revoked.

In some embodiments, the authorization certification includes the service identification information, wherein the service identification information indicates the service type of the data; and accordingly, the first verifying unit is further used to verify the authorization certification based on the first digital signature in the case that any one of the at least one second device supports the service type.

In some embodiments, the first receiving unit 1601 is further used to receive first indication information from the first network element, wherein the first indication information indicates a second device that needs to transmit data to the first network element in the at least one second device.

The apparatus 1600 for implementing security further includes a first transmitting unit, used to transmit first request information to the second device indicated by the first indication information, wherein the first request information is used to request data from the second device indicated by the first indication information.

In some embodiments, the first receiving unit 1601 is further used to receive the data from the second device indicated by the first indication information.

The first transmitting unit is further used to transmit data to the first network element.

In some embodiments, the authorization certification includes the service identification information, wherein the service identification information indicates the service type of the data; and the first transmitting unit is further used to transmit first request information to a second device supporting the service type in the second device indicated by the first indication information.

In some embodiments, the first receiving unit 1601 is further used to receive second request information from the first network element, wherein the second request information is used to request the first device to authorize the first network element to acquire the data of the at least one second device, and the second request information includes the authorization certification; and the first receiving unit 1601 is further used to acquire the authorization certification from the second request information.

In some embodiments, the second request information further includes at least one of: identification information of the first network element; identification information of the first device; identification information of each of the at least one second device; a channel parameter, a public key of the first network element, or a second digital signature; wherein the channel parameter is used to establish a trusted channel between the first network element and the first device, the second digital signature is used for the first device to verify the identity of the first network element, and the second digital signature is acquired by signing information other than the second digital signature in the second request information with the private key of the first network element.

In some embodiments, the first receiving unit 1601 is further used to acquire the authorization certification from the second request information based on a successful verification on the identity of the first network element.

In some embodiments, the second request information further includes a second digital signature acquired by signing with the private key of the first network element; and the first verifying unit is further used to acquire second verification information by verifying the second digital signature using the public key of the first network element; and determine that the identity of the first network element is verified successfully in the case that the second verification information is consistent with information other than the second digital signature in the second request information.

In some embodiments, the first transmitting unit is further used to transmit third request information to a blockchain node, wherein the third request information is used to request the authorization certification of the first network element, the authorization certification being stored in a block of the blockchain node; and the third request information includes storage location information of the authorization certification in the blockchain node; and the first receiving unit 1601 is further used to receive the authorization certification from the blockchain node.

In some embodiments, the first transmitting unit is further used to transmit the data transmitted by the at least one second device to the first network element based on a predetermined time period.

Figure 17:
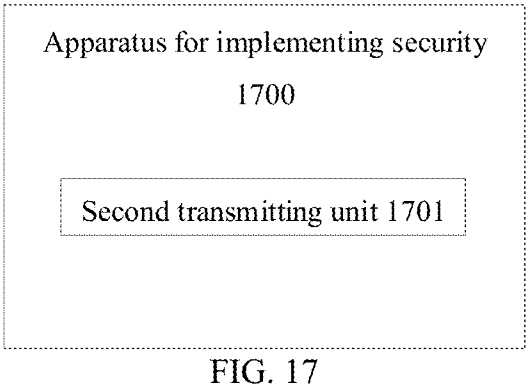
FIG. 17 is a schematic structural diagram of an apparatus 1700 for implementing security according to some embodiments of the present disclosure.

FIG. 17 is a schematic structural diagram of an apparatus 1700 for implementing security according to some embodiments of the present disclosure. The apparatus 1700 for implementing security is applicable to the first network element. As shown in FIG. 17, the apparatus 1700 for implementing security includes:

- a second transmitting unit 1701, used to transmit second request information to a first device. The second request information requests the first device to authorize the first network element to acquire data from at least one second device, wherein the at least one second device is associated with the first device. The second request information includes an authorization certification, wherein the authorization certification is used for the first device to verify whether the first network element is authorized to receive the data from the at least one second device; and the authorization certification is verified based on a first digital signature included in the authorization certification.

In some embodiments, the second request information further includes at least one of: identification information of the first network element, identification information of the first device, identification information of each of the at least one second device, a channel parameter, a public key of the first network element, or a second digital signature, wherein the channel parameter is used to establish a trusted channel between the first network element and the first device, the second digital signature is used for the first device to verify an identity of the first network element, and the second digital signature is acquired by signing information other than the second digital signature in the second request information with a private key of the first network element.

In some embodiments, the apparatus 1700 for implementing security further includes a second receiving unit, used to receive data from the first device, the data being transmitted from the at least one second device to the first device. Alternatively, the second receiving unit is used to receive the data from the at least one second device.

In some embodiments, the second transmitting unit 1701 is further used to transmit fourth request information to a blockchain node, wherein the fourth request information is used to request the authorization certification of the first network element, the authorization certification being stored in a block of the blockchain node; and the fourth request information includes storage location information of the authorization certification in the blockchain node. The second receiving unit is further used to receive the authorization certification from the blockchain node.

In some embodiments, the second transmitting unit 1701 is used to transmit fifth request information to a certification issuing device, wherein the fifth request information is used to request the authorization certification of the first network device.

In some embodiments, the fifth request information includes at least one of: service identification information, identification information of the first network element, a public key of the first network element, data identification information, or a third digital signature, wherein the service identification information indicates a service type of the data, and the third digital signature is acquired by signing with a private key of the first network element.

In some embodiments, the second receiving unit is further used to receive the authorization certification and/or the storage location information from the certification issuing device.

Figure 18:
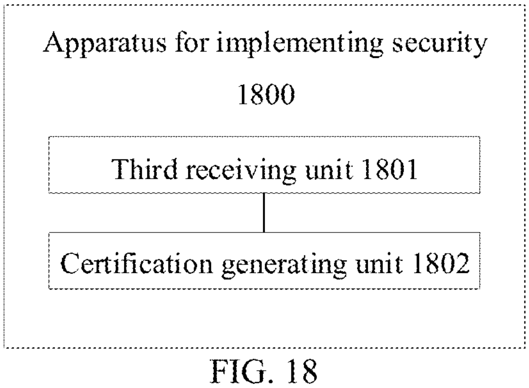
FIG. 18 is a schematic structural diagram of an apparatus 1800 for implementing security according to some embodiments of the present disclosure.

FIG. 18 is a schematic structural diagram of an apparatus 1800 for implementing security according to some embodiments of the present disclosure. The apparatus 1800 for implementing security is applicable to the certification issuing device. As shown in FIG. 18, the apparatus 1800 for implementing security includes:

- a third receiving unit 1801, used to receive fifth request information from a first network element, wherein the fifth request information is used to request an authorization certification of the first network element, the authorization certification being used for a first device to verify whether the first network element is authorized to acquire data, the data being originated from at least one second device associated with the first device; and
- a certification generating unit 1802, used to generate the authorization certification of the first network element.

In some embodiments, the authorization certification includes at least one of: service identification information, identification information of the certification issuing device, a public key of the certification issuing device, identification information of the first network element, a public key of the first network element, an RSA accumulator parameter corresponding to the first network element, data identification information, or a first digital signature, wherein the service identification information indicates a service type of the data, and the first digital signature is acquired by signing with a private key of the certification issuing device.

In some embodiments, the certification generating unit 1802 is further used to generate the authorization certification of the first network element based on a successful verification on an identity of the first network element.

In some embodiments, the apparatus 1800 for implementing security further includes a third transmitting unit, used to transmit the authorization certification to a blockchain node; and

- the third receiving unit 1801 is further used to receive storage location information of the authorization certification from the blockchain node.

In some embodiments, the third transmitting unit is further used to transmit the authorization certification and/or the storage location information to the first network element.

It should be understood by those skilled in the art that, with respect to related descriptions of the apparatuses for implementing security in the embodiments of the present disclosure, references can be made to the related descriptions of the methods for implementing security in the embodiments of the present disclosure.

Figure 19:
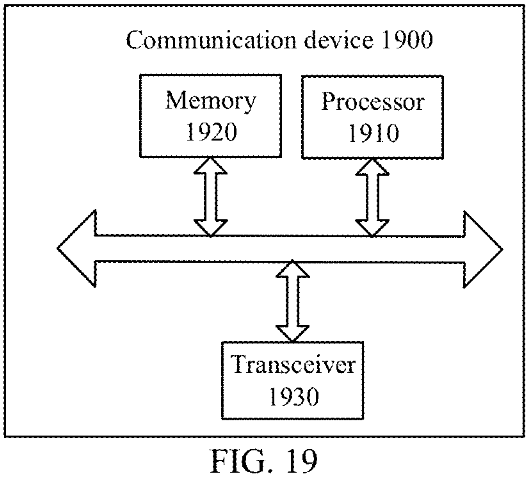
FIG. 19 is a schematic structural diagram of a communication device according to some embodiments of the present disclosure.

FIG. 19 is a schematic structural diagram of a communication device 1900 according to some embodiments of the present disclosure. The communication device is the first device, the first network element, or the certification issuing device. The communication device 1900 shown in FIG. 19 includes a processor 1910. The processor 1910, when loading and running one or more computer programs from a memory, is caused to perform the methods as described in the embodiments of the present disclosure.

In some embodiments, as shown in FIG. 19, the communication device 1900 further includes a memory 1920. The processor 1910, when loading and running one or more computer programs from the memory 1920, is caused to perform the methods as described in the embodiments of the present disclosure.

The memory 1920 is a device independent of the processor 1910, or the memory 1920 is integrated in the processor 1910.

In some embodiments, as shown in FIG. 19, the communication device 1900 further includes a transceiver 1930. The processor 1910 controls the transceiver 1930 to communicate with other devices. For example, the processor 1910 controls the transceiver 1930 to transmit information or data to other devices, or receive information or data from other devices.

The transceiver 1930 may include a transmitter and a receiver. The transceiver 1930 may further include one or more antennas.

In some embodiments, the communication device 1900 is the first device according to the embodiments of the present disclosure, and the communication device 1900 performs the corresponding processes performed by the first device according to the methods described in the embodiments of the present disclosure, which are not described herein for brevity.

In some embodiments, the communication device 1900 is the first network element according to the embodiments of the present disclosure, and the communication device 1900 performs the corresponding processes performed by the first network element according to the methods described in the embodiments of the present disclosure, which are not described herein for brevity.

In some embodiments, the communication device 1900 is the certification issuing device according to the embodiments of the present disclosure, and the communication device 1900 performs the corresponding processes performed by the certification issuing device according to the methods described in the embodiments of the present disclosure, which are not described herein for brevity.

Figure 20:
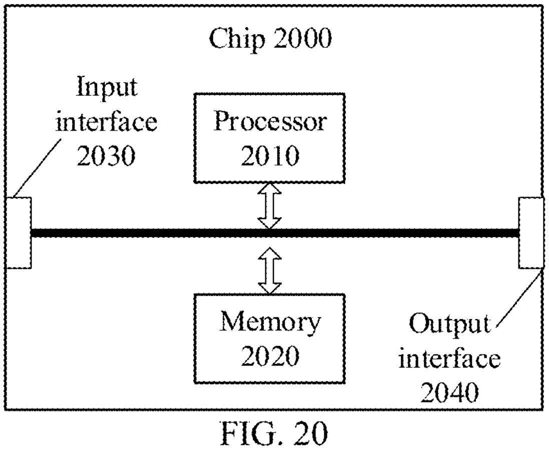
FIG. 20 is a schematic structural diagram of a chip according to some embodiments of the present disclosure.

FIG. 20 is a schematic structural diagram of a chip according to some embodiments of the present disclosure. The chip 2000 includes a processor 2010. The processor 2010, when loading and running one or more computer programs in a memory, is caused to perform the methods as described in the embodiments of the present disclosure.

In some embodiments, as shown in FIG. 20, the chip 2000 further includes a memory 2020. The processor 2010, when loading and running one or more computer programs in the memory 2020, is caused to perform the methods as described in the embodiments of the present disclosure.

The memory 2020 is a device independent of the processor 2010, or the memory 2020 is integrated in the processor 2010.

In some embodiments, the chip 2000 further includes an input interface 2030. The processor 2010 controls the input interface 2030 to communicate with other devices or the chip. For example, the processor 2010 controls the input interface 2030 to acquire information or data from other devices or the chip.

In some embodiments, the chip 2000 further includes an output interface 2040. The processor 2010 controls the output interface 2040 to communicate with other devices or the chip. For example, the processor 2010 controls the output interface 2040 to output information or data to other devices or the chip.

In some embodiments, the chip is applicable to the first device according to the embodiments of the present disclosure, and the chip performs the corresponding processes performed by the first device according to the methods described in the embodiments of the present disclosure, which are not described herein for brevity.

In some embodiments, the chip is applicable to the first network element according to the embodiments of the present disclosure, and the chip performs the corresponding processes performed by the first network element in the methods according to the methods described in the embodiments of the present disclosure, which are not described herein for brevity.

In some embodiments, the chip is applicable to the certificate issuing device according to the embodiments of the present disclosure, and the chip performs the corresponding processes performed by the certificate issuing device according to the methods described in the embodiments of the present disclosure, which are not described herein for brevity.

It is understandable that the chip in the embodiments of the present disclosure is also referred to as a system-level chip, a system chip, a chip system, a system-on-chip, or the like.

Figure 21:
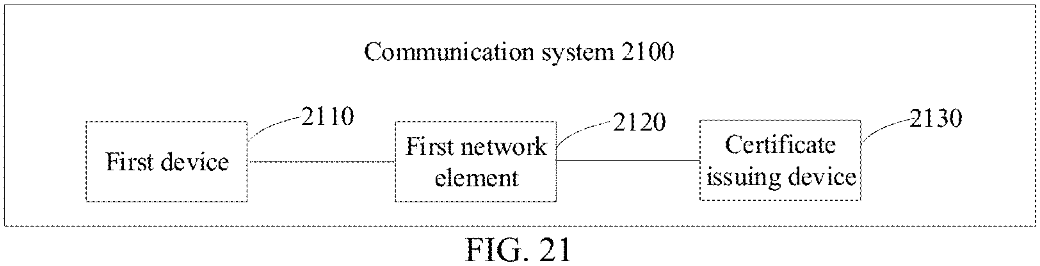
FIG. 21 is a schematic block diagram of a communication system according to some embodiments of the present disclosure.

FIG. 21 is a schematic block diagram of a communication system 2100 according to some embodiments of the present disclosure. As shown in FIG. 21, the communication system 2100 includes a first device 2110, a first network element 2120, and a certificate issuing device 2130.

The first device 2110 performs the corresponding processes performed by the first device in the above methods, the first network element 2120 performs the corresponding processes performed by the first network element in the above methods, and the certificate issuing device 2130 performs the corresponding processes performed by the certificate issuing device in the above methods, which are not described herein for brevity.

It is understandable that the processor in the embodiments of the present disclosure is an integrated circuit chip with a signal processing capability. In the implementations, the processes in the method embodiments are achieved by integrated logic circuits of hardware in the processor or instructions in the software form. The above processor is a general processor, a digital signal processor (DSP), an application-specific integrated circuit (ASIC), a field-programmable gate array (FPGA), other programmable logic devices, discrete gates, transistor logic devices, or discrete hardware assemblies that can achieve or perform various methods, processes, and logic blocks according to the embodiments of the present disclosure. The general processor is a microprocessor, any conventional processor, or the like. The processes in conjunction with the method in the embodiments of the present disclosure can be directly embodied as a hardware decoding processor for processing or be performed by a combination of hardware and software modules in the decoding processor. The software modules are disposed in a random access memory, a flash memory, a read-only memory, a programmable read-only memory, an electrically erasable programmable memory, a register, and other storage mediums mature in the field. The storage medium is disposed in the memory, and the processor reads the information in the memory and combines with its hardware to perform the processes of the above methods.

It is understandable that the memory in embodiments of the present disclosure is a volatile memory or a non-volatile memory, or includes both the volatile memory and the non-volatile memory. The non-volatile memory is a read-only memory (ROM), a programmable ROM (PROM), an erasable PROM (EPROM), an electrically EPROM (EEPROM), or a flash memory. The volatile memory is a random access memory (RAM) used as an external cache. By way of example but not limitation, many forms of RAMs are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It should be noted that the system and the memory described herein are intended to include, but not limit to these and any other suitable type of memories.

It is understandable that the above memory is exemplary but not for limitation. For example, the memory in the embodiments of the present disclosure is also an SRAM, a DRAM, an SDRAM, a DDR SDRAM, an ESDRAM, an SLDRAM, a DR RAM, or the like. That is, the memory in the embodiments of the present disclosure is intend to include, but not limit to these and any other suitable type of memory.

Embodiments of the present disclosure further provide a non-transitory computer-readable storage medium for storing one or more computer programs.

In some embodiments, the non-transitory computer-readable storage medium is applicable to the first network element in the embodiments of the present disclosure, and the one or more computer programs, when loaded and run by a computer, cause the computer to perform the corresponding processes performed by the first network element in the methods according to the embodiments of the present disclosure, which are not described herein for brevity.

In some embodiments, the non-transitory computer-readable storage medium is applicable to the first device in the embodiments of the present disclosure, and the one or more computer programs, when loaded and run by a computer, cause the computer to perform the corresponding processes performed by the first device in the methods according to the embodiments of the present disclosure, which are not described herein for brevity.

In some embodiments, the non-transitory computer-readable storage medium is applicable to the certificate issuing device in the embodiments of the present disclosure, and the one or more computer programs, when loaded and run by a computer, cause the computer to perform the corresponding processes performed by the certificate issuing device in the methods according to the embodiments of the present disclosure, which are not described herein for brevity.

Embodiments of the present disclosure further provide a computer program product. The computer program product includes one or more computer program instructions.

In some embodiments, the computer program product is applicable to the first device in the embodiments of the present disclosure, and the one or more computer program instructions, when loaded and executed by a computer, cause the computer to perform the corresponding processes performed by the first device in the methods according to the embodiments of the present disclosure, which are not described herein for brevity.

In some embodiments, the computer program product is applicable to the first network element in the embodiments of the present disclosure, and the one or more computer program instructions, when loaded and executed by a computer, cause the computer to perform the corresponding processes performed by the first network element in the methods according to the embodiments of the present disclosure, which are not described herein for brevity.

In some embodiments, the computer program product is applicable to the certificate issuing device in the embodiments of the present disclosure, and the one or more computer program instructions, when loaded and executed by a computer, cause the computer to perform the corresponding processes performed by the certificate issuing device in the methods according to the embodiments of the present disclosure, which are not described herein for brevity.

Embodiments of the present disclosure further provide a computer program.

In some embodiments, the computer program is applicable to the first device in the embodiments of the present disclosure, and the computer program, when loaded and run by a computer, causes the computer to perform the corresponding processes performed by the first device in the methods according to the embodiment of the present disclosure, which are not described herein for brevity.

In some embodiments, the computer program is applicable to the first network element in the embodiments of the present disclosure, and the computer program, when loaded and run by a computer, causes the computer to perform the corresponding processes performed by the first network element in the methods according to the embodiments of the present disclosure, which are not described herein for brevity.

In some embodiments, the computer program is applicable to the certificate issuing device in the embodiments of the present disclosure, and the computer program, when loaded and run by a computer, causes the computer to perform the corresponding processes performed by the certificate issuing device in the methods according to the embodiments of the present disclosure, which are not described herein for brevity.

It can be understood by those of ordinary skill in the art that the units and algorithmic processes of the examples described in conjunction with the embodiments disclosed herein can be achieved by the electronic hardware, or by a combination of the computer software and the electronic hardware. Whether these functions are implemented by the hardware or the software depends on the specific application and design constraints of the technical solution. With respect to each application, those skilled in the art may use different methods to achieve the described functions, and such implementations should not be considered beyond the scope of the present disclosure.

It can be understood by those skilled in the art that with respect to the specific operation processes of the system, device, and unit described above, reference is made to the corresponding processes in the above method embodiments for convenience and simplicity of description, which are not repeated herein.

In the embodiments of the present disclosure, it is understandable that the systems, devices, and methods can be implemented in other ways. For example, the above apparatus embodiments are only exemplary. For example, the division of the units is only the logical function division, and the actual implementation may have another division. For example, several units or assemblies can be combined or integrated into another system, or some features can be ignored or not performed. In addition, the coupling, the direct coupling, or the communication connection between each other may be achieved by some interfaces, and the indirect coupling or communication connection between devices or units may be electrical, mechanical or in other form.

The units described as separate parts may or may not be physically separate, and the parts shown as the units may or may not be physical units. That is, the parts may be disposed in one place, or distributed in several network units. Some or all of the units can be selected based on actual needs to achieve the purpose of the technical solutions according to the embodiments.

In addition, the functional units in the embodiments of the present disclosure may be integrated in a processing unit or exist physically separately, or two or more units may be integrated in a unit.

In the case that the functions are achieved in the form of software functional units and sold or used as stand-alone products, the functions may be stored in a non-transitory computer-readable storage medium. Based on this understanding, the nature of the technical solutions of the present disclosure, the part contributed to the prior art, or the part of the technical solutions may be embodied in the form of a software product, wherein the software product is stored in a storage medium and includes a number of instructions for causing a computer device (which may be a personal computer, a server, a network equipment, or the like) to perform all or part of the processes of the method in various embodiments of the present disclosure. The above storage medium include: a U disk, a mobile hard disk, a ROM, a RAM, a disk, a disc, or other medium that can store program codes.

Described above are merely specific embodiments of the present disclosure, and the protection scope of the present disclosure is not limited. Any changes or replacements made within the technical scope of the present disclosure by those skilled in the art should be encompassed within the protection scope of the present disclosure. Thus, the protection scope of the present disclosure shall prevail in the protection scope of the claims.

What is claimed is:

1. A method for implementing security, applicable to a first device, the method comprising:
- acquiring an authorization certification of a first network element, wherein the authorization certification is used to verify whether the first network element is authorized to receive data, the data being originated from at least one second device associated with the first device; and the authorization certification comprises a first digital signature;
- verifying the authorization certification based on the first digital signature; and
- determining that the first network element is authorized to receive the data from the at least one second device based on a successful verification on the authorization certification based on the first digital signature.

2. The method according to claim 1, wherein the authorization certification comprises at least one of:
- service identification information, wherein the service identification information indicates a service type of the data;
- data identification information, wherein the data identification information indicates a data type of the data;
- identification information of a certification issuing device;
- a public key of the certification issuing device;
- identification information of the first network element;
- a public key of the first network element; or
- an RSA accumulator parameter corresponding to the first network element.

3. The method according to claim 1, wherein the first digital signature is acquired by signing with a private key of a certification issuing device; and the method further comprises:
- acquiring first verification information by verifying the first digital signature using a public key of the certification issuing device; and
- determining that the authorization certification is verified successfully in a case that the first verification information is consistent with information other than the first digital signature in the authorization certification.

4. The method according to claim 1, wherein:
- the authorization certification comprises an RSA accumulator parameter corresponding to the first network element; and
- determining that the first network element is authorized to receive the data from the at least one second device based on the successful verification on the authorization certification based on the first digital signature comprises:
- verifying, based on the first digital signature, whether the authorization certification is revoked based on the RSA accumulator parameter based on the successful verification on the authorization certification; and
- determining that the first network element is authorized to receive the data from the at least one second device in a case that the authorization certification is not revoked.

5. The method according to claim 1, wherein the authorization certification comprises service identification information and/or data identification information, the service identification information indicating a service type of the data, and the data identification information indicating a data type of the data; and the method further comprises:
- verifying the authorization certification based on the first digital signature in a case that any one of the at least one second device supports the service type and/or the data type.

6. The method according to claim 1, wherein upon determining that the first network element is authorized to receive the data from the at least one second device, the method further comprises:
- receiving first indication information from the first network element, wherein the first indication information indicates at least one second device that needs to transmit data to the first network element in the at least one second device; and
- transmitting first request information to the at least one second device indicated by the first indication information, wherein the first request information is used to request data of the at least one second device indicated by the first indication information.

7. The method according to claim 6, further comprising:
- receiving data from the at least one second device indicated by the first indication information; and
- transmitting the data to the first network element.

8. The method according to claim 6, wherein:
- the authorization certification comprises service identification information and/or data identification information, the service identification information indicating a service type of the data; and transmitting the first request information to the at least one second device indicated by the first indication information comprises:

transmitting the first request information to a second device supporting the service type and/or a data type in the at least one second device indicated by the first indication information.

9. A first device, comprising:

a processor; and a memory storing one or more computer programs, which, when executed by the processor, cause the first device to:

acquire an authorization certification of a first network element, wherein the authorization certification is used to verify whether the first network element is authorized to receive data, the data being originated from at least one second device associated with the first device; and the authorization certification comprises a first digital signature;

verify the authorization certification based on the first digital signature; and determine that the first network element is authorized to receive the data from the at least one second device based on a successful verification on the authorization certification based on the first digital signature.

10. The first device according to claim 9, wherein the one or more computer programs, when executed by the processor, further cause the first device to:

receive second request information from the first network element, wherein the second request information is used to request the first device to authorize the first network element to acquire the data from the at least one second device, and the second request information comprises the authorization certification; and acquire the authorization certification from the second request information.

11. The first device according to claim 10, wherein the second request information further comprises at least one of:

identification information of the first network element;

identification information of the first device;

identification information of each of the at least one second device;

a channel parameter, wherein the channel parameter is used to establish a trusted channel between the first network element and the first device;

a public key of the first network element; or a second digital signature, wherein the second digital signature is used for the first device to verify an identity of the first network element, and the second digital signature is acquired by signing information other than the second digital signature in the second request information with a private key of the first network element.

12. The first device according to claim 10, wherein the one or more computer programs, when executed by the processor, further cause the first device to:

acquire the authorization certification from the second request information based on a successful verification on an identity of the first network element, wherein the second request information further comprises a second digital signature acquired by signing with a private key of the first network element; and the one or more computer programs, when executed by the processor, further cause the first device to:

acquire second verification information by verifying the second digital signature using a public key of the first network element; and determine that the identity of the first network element is verified successfully in a case that the second verification information is consistent with information other than the second digital signature in the second request information.

13. The first device according to claim 9, wherein the one or more computer programs, when executed by the processor, further cause the first device to:

transmit third request information to a blockchain node, wherein the third request information is used to request the authorization certification of the first network element, the authorization certification being stored in a block of the blockchain node; and the third request information comprises storage location information of the authorization certification in the blockchain node; and receive the authorization certification from the blockchain node.

14. A first network element, comprising:

a processor; and a memory storing one or more computer programs, which, when executed by the processor, cause the first network element to:

transmit second request information to a first device, wherein the second request information is used to request the first device to authorize the first network element to acquire data from at least one second device, wherein the at least one second device is associated with the first device;

wherein the second request information comprises an authorization certification, the authorization certification being used for the first device to verify whether the first network element is authorized to receive the data from the at least one second device; and the authorization certification being verified by the first device based on a first digital signature included in the authorization certification.

15. The first network element according to claim 14, wherein the second request information further comprises at least one of:

identification information of the first network element;

identification information of the first device;

identification information of each of the at least one second device;

a channel parameter, wherein the channel parameter is used to establish a trusted channel between the first network element and the first device;

a public key of the first network element; or a second digital signature, wherein the second digital signature is used for the first device to verify an identity of the first network element, and the second digital signature is acquired by signing information other than the second digital signature in the second request information with a private key of the first network element.

16. The first network element according to claim 14, wherein the one or more computer programs, when executed by the processor, further cause the first network element to:

receive data from the first device, wherein the data is transmitted to the first device by the at least one second device; or receive data from the at least one second device.

17. The first network element according to claim 14, wherein the one or more computer programs, when executed by the processor, further cause the first network element to:

transmit fourth request information to a blockchain node, wherein the fourth request information is used to request the authorization certification of the first network element, the authorization certification being stored in a block of the blockchain node, and the fourth request information comprises storage location information of the authorization certification in the blockchain node; and receive the authorization certification from the blockchain node.

18. The first network element according to claim 17, wherein the one or more computer programs, when executed by the processor, further cause the first network element to:

transmit fifth request information to a certification issuing device, wherein the fifth request information is used to request the authorization certification of the first network element.

19. The first network element according to claim 18, wherein the fifth request information comprises at least one of:

service identification information, wherein the service identification information indicates a service type of the data;

identification information of the first network element;

a public key of the first network element;

data identification information; or a third digital signature, wherein the third digital signature is acquired by signing with a private key of the first network element.

* * * * *